(12) United States Patent
Shigematsu

(10) Patent No.: US 7,012,778 B2
(45) Date of Patent: Mar. 14, 2006

(54) ECCENTRICITY CONTROL METHOD FOR MAGNETIC DISK, RECORDING MEDIUM RECORDING ECCENTRICITY CONTROL METHOD, AND MAGNETIC DISK APPARATUS USING ECCENTRICITY CONTROL METHOD

(75) Inventor: Norio Shigematsu, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 349 days.

(21) Appl. No.: 10/450,636

(22) PCT Filed: Oct. 4, 2002

(86) PCT No.: PCT/JP02/10392

§ 371 (c)(1),
(2), (4) Date: Jun. 13, 2003

(87) PCT Pub. No.: WO03/034430

PCT Pub. Date: Apr. 24, 2003

(65) Prior Publication Data

US 2004/0047066 A1    Mar. 11, 2004

(30) Foreign Application Priority Data

Oct. 16, 2001    (JP) .............................. 2001-318501

(51) Int. Cl.
*G11B 5/596* (2006.01)

(52) U.S. Cl. ..................................... 360/77.04; 360/75

(58) Field of Classification Search ............. 360/77.04, 360/75
See application file for complete search history.

(56) References Cited

U.S. PATENT DOCUMENTS

| 5,402,280 | A | * | 3/1995 | Supino ..................... 360/77.04 |
| 5,550,685 | A | * | 8/1996 | Drouin ..................... 360/77.08 |
| 5,886,846 | A | * | 3/1999 | Pham et al. ............. 360/78.04 |
| 6,381,292 | B1 | * | 4/2002 | Yamakoshi ................. 375/376 |

FOREIGN PATENT DOCUMENTS

| JP | 2-246063 A | 10/1990 |
| JP | 6-176514 A | 6/1994 |
| JP | 7-50076 A | 2/1995 |
| JP | 7-192413 A | 7/1995 |
| JP | 10-208418 A | 8/1998 |
| JP | 10-254852 A | 9/1998 |
| JP | 11-39814 A | 2/1999 |

\* cited by examiner

*Primary Examiner*—David Hudspeth
*Assistant Examiner*—Dan I Davidson
(74) *Attorney, Agent, or Firm*—Akin Gump Strauss Hauer & Feld, LLP

(57) ABSTRACT

In the start up of the magnetic disk apparatus, the phase relation between servo information numbers recorded on the magnetic disk 15 in advance and the eccentricity of the magnetic disk is learned. In the positioning of the magnetic head, a signal generated by multiplying, by a weight coefficient, a sine wave or a cosine wave the phase the revolution frequency of the magnetic disk is fed forward as an eccentricity control amount, whereby the eccentricity is compensated.

30 Claims, 10 Drawing Sheets (a)

(b)

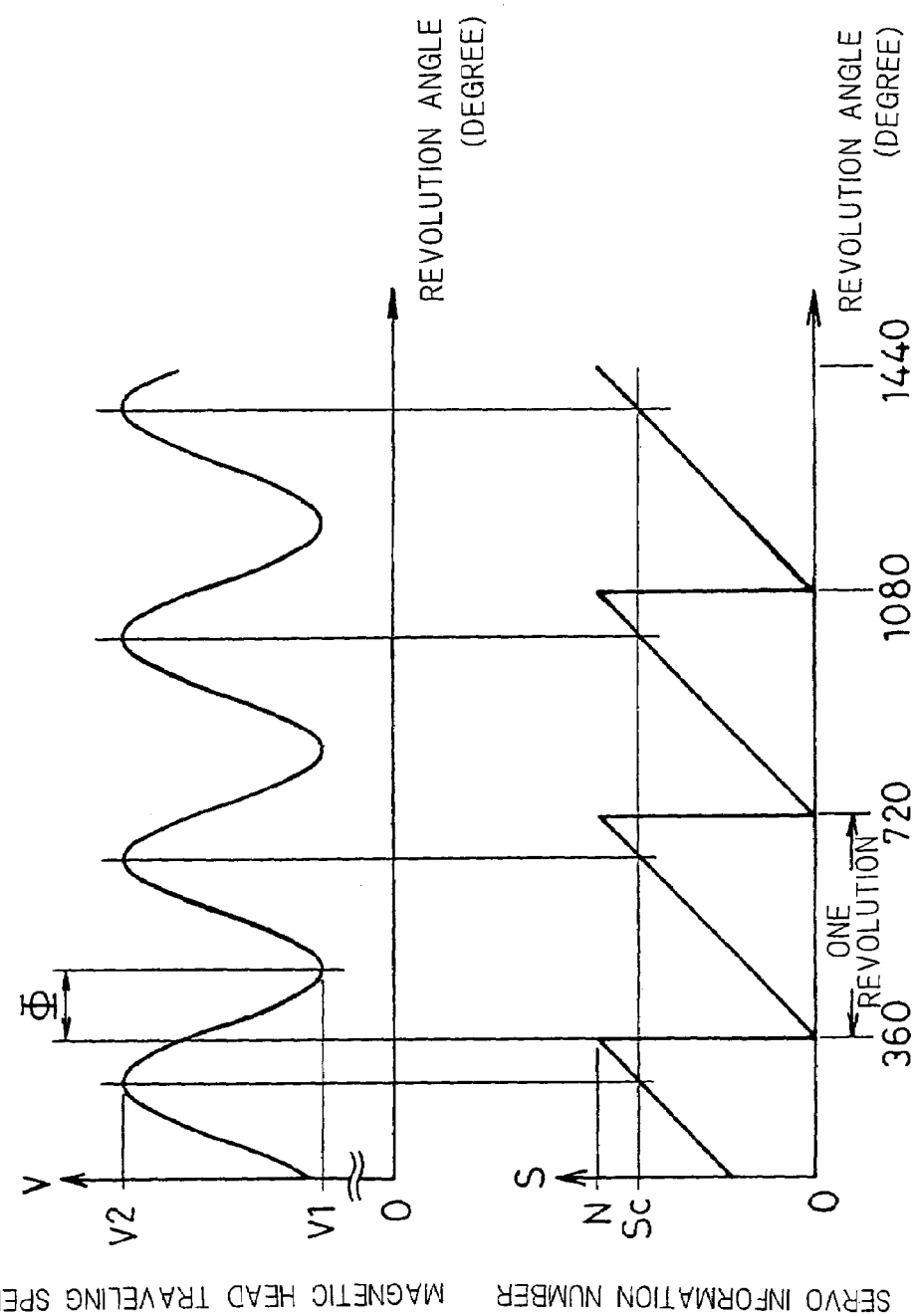
F I G. 6

ECCENTRICITY CONTROL METHOD FOR MAGNETIC DISK, RECORDING MEDIUM RECORDING ECCENTRICITY CONTROL METHOD, AND MAGNETIC DISK APPARATUS USING ECCENTRICITY CONTROL METHOD

CROSS-REFERENCE TO RELATED APPLICATION

This application is a Section 371 of International Application No. PCT/JP02/10392, filed Oct. 4, 2002, the disclosure of which is incorporated herein by reference.

TECHNICAL FIELD

The present invention relates to an eccentricity control method for magnetic disk for causing a magnetic head to follow a target track of an off-centered magnetic disk, and a magnetic disk apparatus using this eccentricity control method.

BACKGROUND ART

In a magnetic disk apparatus, in order to perform recording and reproduction on a target track of an off-centered magnetic disk with a magnetic head, a magnetic head control apparatus is necessary for causing the magnetic head to follow the target track which varies continually in distance from a revolution center owing to the eccentricity. A conventional eccentricity control apparatus of a prior art magnetic head control apparatus comprises a sine wave and cosine wave generator, a digital Fourier transformer and a multiplier. The sine wave and cosine wave generator outputs sine wave and cosine wave signals corresponding to the revolution frequency of a motor of a magnetic disk apparatus. The digital Fourier transformer performs digital Fourier transformation on the position error relative to a target position of the magnetic head on the basis of the above-mentioned sine wave and the cosine wave signals. The position error processed by the digital Fourier transformation is multiplied by the weight coefficient of each of the sine wave and cosine wave vectors, and then a signal of the value obtained by adding both is made an eccentricity correction signal. The eccentricity correction signal is used for the control of the magnetic head so as to compensate the eccentricity of the magnetic disk and thereby cause the magnetic head to follow the target track. The result of the above-mentioned digital Fourier transformation is multiplied and summed (hereinafter is referred to as multiplication and summation operation) repeatedly for each revolution of the magnetic disk. Then, the position error which has been reduced by the first compensation is processed by the multiplication and summation operation into the second digital Fourier transformation result. The second compensation realizes a state equivalent to a further reduction of eccentricity, and hence the position error is reduced further. As such, by performing the multiplication and summation operation of the digital Fourier transformation result, the position error due to eccentricity can be theoretically reduced into infinitesimal.

In the above-mentioned magnetic head eccentricity control apparatus, a signal indicating the position error from the position (hereinafter is referred to as a target position) of the target track on which the magnetic head is to follow is processed by digital Fourier transformation on the basis of the sine wave and cosine wave signals. Each of the sine wave and cosine wave vectors of the signal processed by the digital Fourier transformation is multiplied by a weight coefficient, and then the value of the sum of both is outputted as an eccentricity correction signal. This results in a large amount of the multiplication and summation operation, and hence needs a large amount of time in the calculation. The control delay due to the necessity of a large amount of time in the calculation causes directly an adverse effect to the control performance. With increasing track density in the future, the sampling frequency in the digital Fourier transformation will become higher, whereby the speed-up of the calculation in the control apparatus is required in order to meet the higher frequency. Further, during the seek and the settling of the magnetic head, a large variation occurs in the position error of the magnetic head. Consequently, there is a case that the eccentricity correction signal is not correctly calculated, and the control performance is prone to deteriorate.

DISCLOSURE OF THE INVENTION

In an eccentricity control method for magnetic head according to the invention, a magnetic head for recording and reproducing information onto or from the revolving magnetic disk is positioned at a target position by reading servo information containing a series of servo information numbers provided along each of a plurality of tracks having a series of track numbers on a magnetic disk with the magnetic head. This magnetic head positioning method comprises a phase learning step of learning a phase deviation amount indicating the phase relation between a change in the above-mentioned servo information number read by the above-mentioned magnetic head and a change in the eccentricity amount of the magnetic disk. The method further comprises: a step of detecting a positioning error signal of the magnetic head on the basis of the above-mentioned phase deviation amount; a step of generating a signal of sine wave in synchronization with the revolution frequency of the magnetic disk or of cosine wave having a phase difference of 90 degrees relative to the above-mentioned sine wave; and a step of obtaining a weight coefficient from the above-mentioned signal of sine wave or cosine wave and the above-mentioned magnetic head positioning error signal. The method furthermore comprises: a step of multiplying the signal of sine wave or cosine wave by the above-mentioned weight coefficient and thereby obtaining an eccentricity compensation signal indicating an eccentricity control amount; and a step of controlling the magnetic head by using the above-mentioned eccentricity compensation signal, and thereby compensating the eccentricity of the magnetic disk.

According to the method of the invention, the eccentricity control amount of the magnetic head is calculated at high speed, whereby the time necessary for the calculation is reduced. This reduces the control delay caused by the time necessary for the calculation, and thereby improves the control performance.

In the above-mentioned phase learning step, the servo information number of a position where the track number varying with respect to the position of the magnetic head becomes maximum or minimum is measured for a predetermined number of times with the revolution period of the magnetic disk. The average of the measured servo information numbers is calculated, and thereby the phase relation between a change in the above-mentioned servo information number and a change in the eccentricity amount of the magnetic disk is learned.

In the above-mentioned phase learning step, the servo information number of a position where the position error of the magnetic head relative to a target track becomes maximum or minimum is measured for a predetermined number of times with the revolution period of the magnetic disk. The average of the measured servo information numbers is calculated, and thereby the phase relation between a change in the above-mentioned servo information number and a change in the eccentricity amount of the magnetic disk is learned.

In the above-mentioned phase learning step, the servo information number of a position where the traveling speed of the magnetic head following a target track becomes maximum or minimum is measured for a predetermined number of times with the revolution period of the magnetic disk. The average of the measured servo information numbers is calculated, and thereby the phase relation between a change in the above-mentioned servo information number and a change in the eccentricity amount of the magnetic disk is learned.

In the above-mentioned phase learning step, the servo information number of a position corresponding to the middle point of the variation range of the position error of the magnetic head relative to a target track is measured for a predetermined number of times with the revolution period of the magnetic disk. The average of the measured servo information numbers is calculated, and thereby the phase relation between a change in the above-mentioned servo information number and a change in the eccentricity amount of the magnetic disk is learned.

In the above-mentioned phase learning step, the servo information number of a position corresponding to the middle point of the variation range of he traveling speed of the magnetic head following a target track is measured for a predetermined number of times with the revolution period of the magnetic disk. The average of the measured servo information numbers is calculated, and thereby the phase relation between a change in the above-mentioned servo information number provided on the magnetic disk and a change in the eccentricity amount of the magnetic disk is learned.

In the above-mentioned phase learning step, two or three from the servo information numbers of positions corresponding to the maximum value, the minimum value, and the middle point of the variation range of the position error of the magnetic head relative to a target track are measured. The difference is calculated between the measured servo information numbers, and then when the difference falls within a predetermined value range, the phase relation between a change in the above-mentioned servo information number and a change in the eccentricity amount of the magnetic disk is learned.

In the above-mentioned phase learning step, two or three from the servo information numbers of positions corresponding to the maximum value, the minimum value, and the middle point of the variation range of the traveling speed of the magnetic head following a target track are measured. The difference is calculated between the measured servo information numbers, and then when the difference falls within a predetermined range, the phase relation between a change in the above-mentioned servo information number and a change in the eccentricity amount of the magnetic disk is learned.

A step of calculating the traveling speed of the magnetic head is provided on the basis of the counter electromotive voltage of a voice coil motor for driving the magnetic head; in the above-mentioned phase learning step, the phase deviation amount between a change in the above-mentioned servo information number provided on the magnetic disk and a change in the eccentricity amount of the magnetic disk is learned. In the positioning of the magnetic head, the above-mentioned learned phase deviation amount is corrected using any one of the sine wave and the cosine wave depending on the revolution frequency of the magnetic disk. In the eccentricity compensating step, the signal obtained by multiplying the signal of sine wave or cosine wave by the weight coefficient is fed forward as the eccentricity compensation signal, whereby in a predetermined position between a servo information and another servo information, the eccentricity of the magnetic disk is compensated using the above-mentioned calculated traveling speed of the head.

In the above-mentioned phase learning step, the phase relation between the above-mentioned servo information number provided on the magnetic disk and the eccentricity of the magnetic disk is learned. In the positioning of the magnetic head, the learned phase deviation amount is corrected using any one of the sine wave and the cosine wave depending on the revolution frequency of the magnetic disk. The signal obtained by multiplying the signal of sine wave or cosine wave by the weight coefficient is fed forward as the eccentricity compensation signal so that the eccentricity of the magnetic disk is compensated. In seek and settling, the calculation of the weight coefficient and the re-calculation of the phase relation between the servo information number and the eccentricity are stopped, and then the eccentricity is compensated using a weight coefficient and a phase deviation correction value which are constant.

A recording medium which records a program of an eccentricity control method for magnetic disk according to the present invention records a program of an eccentricity control method for magnetic disk comprising a phase learning step. A magnetic disk apparatus having good control performance is realized by using this recording medium in a magnetic head eccentricity control apparatus.

In the above-mentioned phase learning step, the servo information number of a position where the track number varying with respect to the position of the magnetic head becomes maximum or minimum is measured for a predetermined number of times with the revolution period of the magnetic disk. The recording medium records a program in which the average of the measured servo information numbers is calculated, and in which the phase relation between a change in the above-mentioned servo information number and a change in the eccentricity amount of the magnetic disk is thereby learned.

In the above-mentioned phase learning step, the servo information number of a position where the position error of the magnetic head relative to a target track becomes maximum or minimum is measured for a predetermined number of times with the revolution period of the magnetic disk. The recording medium records a program in which the average of the measured servo information numbers is calculated, and in which the phase relation between a change in the above-mentioned servo information number and a change in the eccentricity amount of the magnetic disk is thereby learned.

In the above-mentioned phase learning step, the servo information number of a position where the traveling speed of the magnetic head following a target track becomes maximum or minimum is measured for a predetermined number of times with the revolution period of the magnetic disk. The recording medium records a program in which the average of the measured servo information numbers is calculated, and in which the phase relation between a change in the above-mentioned servo information number and a change in the eccentricity amount of the magnetic disk is thereby learned.

In the above-mentioned phase learning step, the servo information number of a position corresponding to the middle point of the variation range of the position error of the magnetic head relative to a target track is measured for a predetermined number of times with the revolution period of the magnetic disk. The recording medium records a program in which the average of the measured servo information numbers is calculated, and in which the phase relation between a change in the above-mentioned servo information number and a change in the eccentricity amount of the magnetic disk is thereby learned.

In the above-mentioned phase learning step, the servo information number of a position corresponding to the middle point of the range of variation of the traveling speed of the magnetic head following a target track is measured for a predetermined number of times with the revolution period of the magnetic disk. The recording medium records a program in which the average of the measured servo information numbers is calculated, and in which the phase relation between a change in the above-mentioned servo information number provided on the magnetic disk and a change in the eccentricity amount of the magnetic disk is thereby learned.

In the above-mentioned phase learning step, two or three from the servo information numbers of positions corresponding to the maximum value, the minimum value, and the middle point of the variation range of the position error of the magnetic head relative to a target track are measured. The recording medium records a program in which the difference is calculated between the measured servo information numbers, and in which when the difference falls within a predetermined value range, the phase relation between a change in the above-mentioned servo information number and a change in the eccentricity amount of the magnetic disk is learned.

In the above-mentioned phase learning step, two or three from the servo information numbers of positions corresponding to the maximum value, the minimum value, and the middle point of the variation range of the traveling speed of the magnetic head following a target track are measured. The recording medium records a program in which the difference is calculated between the measured servo information numbers, and in which when the difference falls within a predetermined value range, the phase relation between a change in the above-mentioned servo information number and a change in the eccentricity amount of the magnetic disk is learned.

A recording medium which records a program of an eccentricity control method for magnetic disk according to the present invention records a program of an eccentricity control method for magnetic disk comprising a phase learning step. The eccentricity control method for magnetic head comprises a step of calculating the traveling speed of the magnetic head on the basis of the counter electromotive voltage of a voice coil motor for driving the magnetic head. In the above-mentioned phase learning step, the phase deviation amount between a change in the above-mentioned servo information number provided on the magnetic disk and a change in the eccentricity amount of the magnetic disk is learned, while in the positioning of the magnetic head, the above-mentioned learned phase deviation amount is corrected using any one of the sine wave and the cosine wave depending on the revolution frequency of the magnetic disk. The recording medium records a program in which in the eccentricity compensating step, the signal obtained by multiplying the signal of sine wave or cosine wave by the weight coefficient is fed forward as the eccentricity compensation signal, and in which in a predetermined position between a servo information and another servo information, the eccentricity of the magnetic disk is compensated using the above-mentioned calculated traveling speed of the head.

In the above-mentioned phase learning step, the phase relation between the above-mentioned servo information number provided on the magnetic disk and the eccentricity of the magnetic disk is learned, while in the positioning of the magnetic head, the learned phase deviation amount is corrected using any one of the sine wave and the cosine wave depending on the revolution frequency of the magnetic disk. The signal obtained by multiplying the signal of sine wave or cosine wave by the weight coefficient is fed forward as the eccentricity compensation signal so that the eccentricity of the magnetic disk is compensated. The recording medium records a program in which in seek and settling, the calculation of the weight coefficient and the re-calculation of the phase relation between the servo information number and the eccentricity are stopped, and then the eccentricity is compensated using a weight coefficient and a phase deviation correction value which are constant.

A magnetic disk apparatus according to the present invention comprises a magnetic head positioning apparatus for positioning a magnetic head for recording and reproducing information onto or from a revolving magnetic disk, at a target position by reading servo information containing a series of servo information numbers provided along each of a plurality of tracks having a series of track numbers on the magnetic disk with the above-mentioned magnetic head. The magnetic disk apparatus further comprises: a phase learning device for learning a phase deviation amount which is the phase relation between a change in the above-mentioned servo information number read by the magnetic head and a change in the eccentricity amount of the magnetic disk; an error detector for detecting a magnetic head positioning error signal on the basis of the above-mentioned phase deviation amount; and a sine wave generator for generating a signal of sine wave in synchronization with the revolution frequency of the magnetic disk or of cosine wave having a phase difference of 90 degrees relative to the above-mentioned sine wave. The magnetic disk apparatus furthermore,comprises: an eccentricity control amount calculator for determining a weight coefficient from the above-mentioned signal of sine wave or cosine wave and the above-mentioned magnetic head positioning error signal and thereby outputting an eccentricity control amount; and a positioning controller for generating an eccentricity compensation signal on the basis of the above-mentioned eccentricity control amount and thereby outputting the signal to the magnetic head.

The above-mentioned phase learning device measures the servo information number of a position where the track number varying depending on the position of the magnetic head becomes maximum or minimum, for a predetermined number of times with the revolution period of the magnetic disk. The phase learning device calculates the average of the measured servo information numbers, and thereby learns the phase relation between a change in said servo information number and a change in the eccentricity amount of the magnetic disk.

Said phase learning device measures the servo information number of a position where the position error of the magnetic head relative to a target track becomes maximum or minimum, for a predetermined number of times with the revolution period of the magnetic disk. The phase learning device calculates the average of the measured servo information numbers, and thereby learns the phase relation between a change in said servo information number and a change in the eccentricity amount of the magnetic disk.

The above-mentioned phase learning device measures the servo information number of a position where the traveling speed of the magnetic head following a target track becomes maximum or minimum, for a predetermined number of times with the revolution period of the magnetic disk. The phase learning device calculates the average of the servo information numbers, and thereby learns the phase relation between a change in the above-mentioned servo information number provided on the magnetic disk and a change in the eccentricity amount of the magnetic disk.

The above-mentioned phase learning device measures the servo information number of a position corresponding to the middle point of the range of variation of the position error of the magnetic head relative to a target track, for a predetermined number of times with the revolution period of the magnetic disk. The phase learning device calculates the average of the servo information numbers, and thereby learns the phase relation between a change in the above-mentioned servo information number and a change in the eccentricity amount of the magnetic disk.

The above-mentioned phase learning device measures the servo information number of a position corresponding to the middle point of the range of variation of the traveling speed of the magnetic head following a target track, for a predetermined number of times with the revolution period of the magnetic disk. The phase learning device calculates the average of the servo information numbers, and thereby learns the phase relation between a change in the above-mentioned servo information number provided on the magnetic disk and a change in the eccentricity amount of the magnetic disk.

The above-mentioned phase learning device measures two or three from the servo information numbers of positions corresponding to the maximum value, the minimum value, and the middle point of the range of variation of the position error of the magnetic head relative to a target track. The phase learning device calculates the difference between the measured servo information numbers, and then learns the phase relation between a change in the above-mentioned servo information number provided on the magnetic disk and a change in the eccentricity amount of the magnetic disk, when the difference falls within a predetermined range.

The above-mentioned phase learning device measures two or three from the servo information numbers of positions corresponding to the maximum value, the minimum value, and the middle point of the range of variation of the speed of the magnetic head following a target track. The phase learning device calculates the difference between the measured servo information numbers, and then learns the phase relation between a change in the above-mentioned servo information number provided on the magnetic disk and a change in the eccentricity amount of the magnetic disk, when the difference falls within a predetermined range.

The above-mentioned phase learning device learns the phase deviation amount between the above-mentioned servo information number provided on the magnetic disk and the eccentricity amount of the magnetic disk. In the positioning of the magnetic head, the above-mentioned learned phase deviation amount is corrected using any one of the sine wave and the cosine wave depending on the revolution frequency of the magnetic disk. The signal obtained by multiplying the signal of sine wave or cosine wave by the weight coefficient is fed forward as the eccentricity compensation signal, whereby in a predetermined position between a piece of servo information and another piece of servo information, the eccentricity is compensated using the traveling speed of the magnetic head calculated by the above-mentioned head speed calculating section.

In the start up of the magnetic disk apparatus, the phase relation between a change in the above-mentioned servo information number provided on the magnetic disk and the eccentricity of the magnetic disk is learned, whereby in the positioning of the magnetic head, the above-mentioned learned phase deviation amount is corrected using any one of the sine wave and the cosine wave depending on the revolution frequency of the magnetic disk. The eccentricity control amount calculator feeds forward the signal obtained by multiplying the signal of sine wave or cosine wave by the weight coefficient, as the eccentricity compensation signal, and thereby compensates the eccentricity. In seek and settling, the calculation of the weight coefficient and the re-calculation of the phase relation between the servo information number and the eccentricity are stopped, and then the eccentricity is compensated using a weight coefficient and a phase deviation amount correction value which are constant.

BRIEF DESCRIPTION OF DRAWINGS

FIG. 6A is a waveform diagram showing the change of the traveling speed of a magnetic head relative to the revolution angle in a magnetic disk apparatus according to the third embodiment of the invention;

FIG. 6B is a waveform diagram showing the change of the above-mentioned servo information number relative to the revolution angle;

BEST MODE FOR CARRYING OUT THE INVENTION

Preferred embodiments of the invention are described below with reference to FIG. 1 through FIG. 10.

First Embodiment

Figure 2:
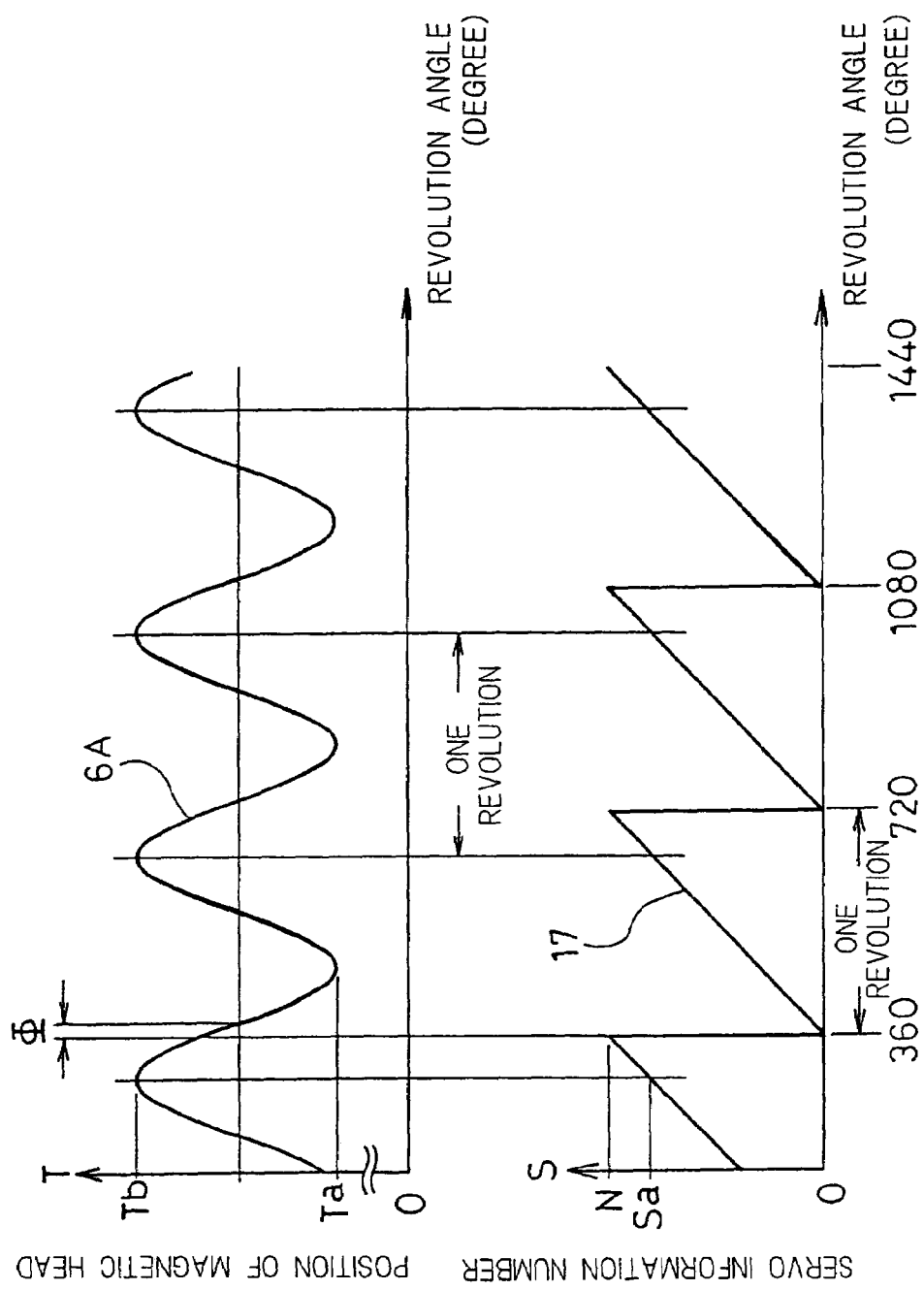
FIG. 2A is a waveform diagram showing the change of the position of a magnetic head relative to the revolution angle of a magnetic disk in a magnetic disk apparatus according to the first embodiment of the invention.
FIG. 2B is a waveform diagram showing the change of the servo information number relative to the above-mentioned revolution angle.
Figure 3:
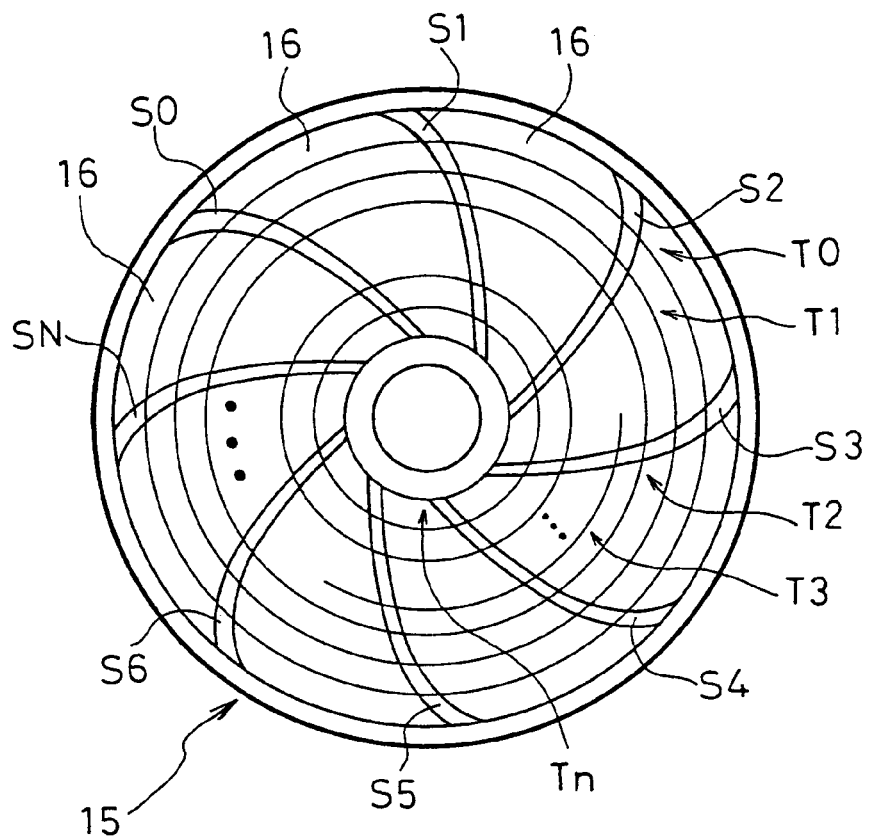
FIG. 3A is a plan view showing the arrangement of servo information on a magnetic disk used commonly in respective embodiments of the invention.
FIG. 3B is an enlarged partial plan view of the above-mentioned magnetic disk.
Figure 3:
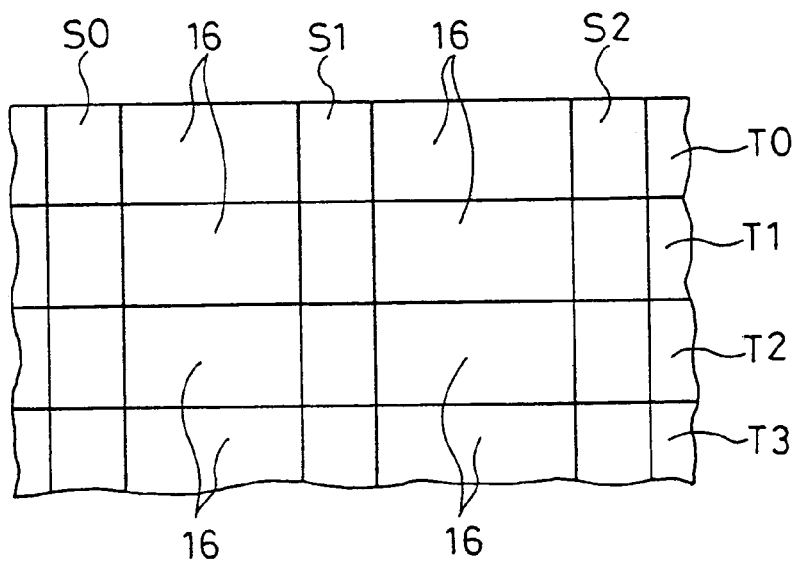
Figure 4:
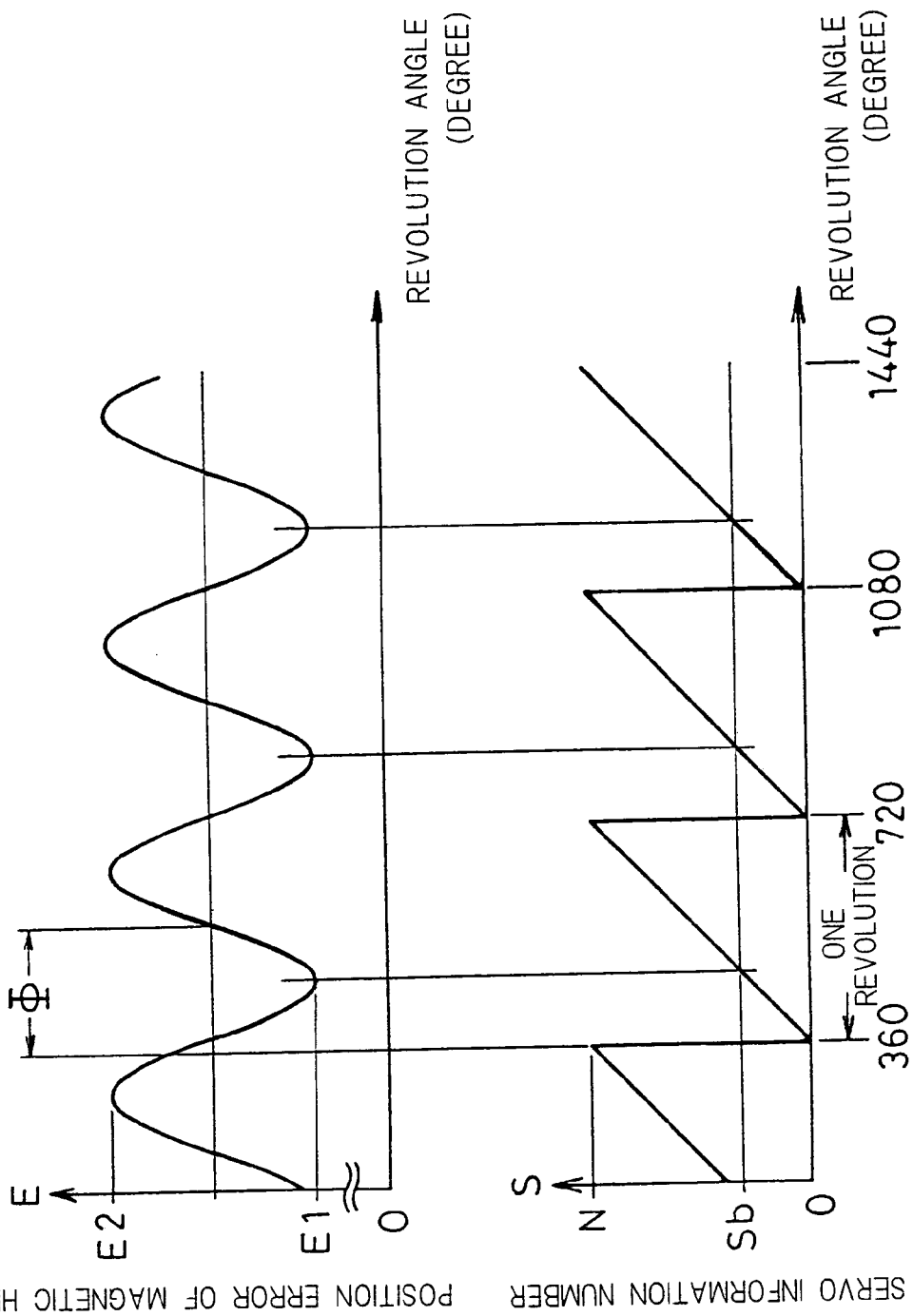
FIG. 4A is a waveform diagram showing the change of the position error of a magnetic head relative to the revolution angle in a magnetic disk apparatus according to a second embodiment of the invention.
FIG. 4B is a waveform diagram showing the change of the above-mentioned servo information number relative to the revolution angle.

A first embodiment of the invention is described below with reference to FIG. 1 through FIG. 3.

Figure 1:
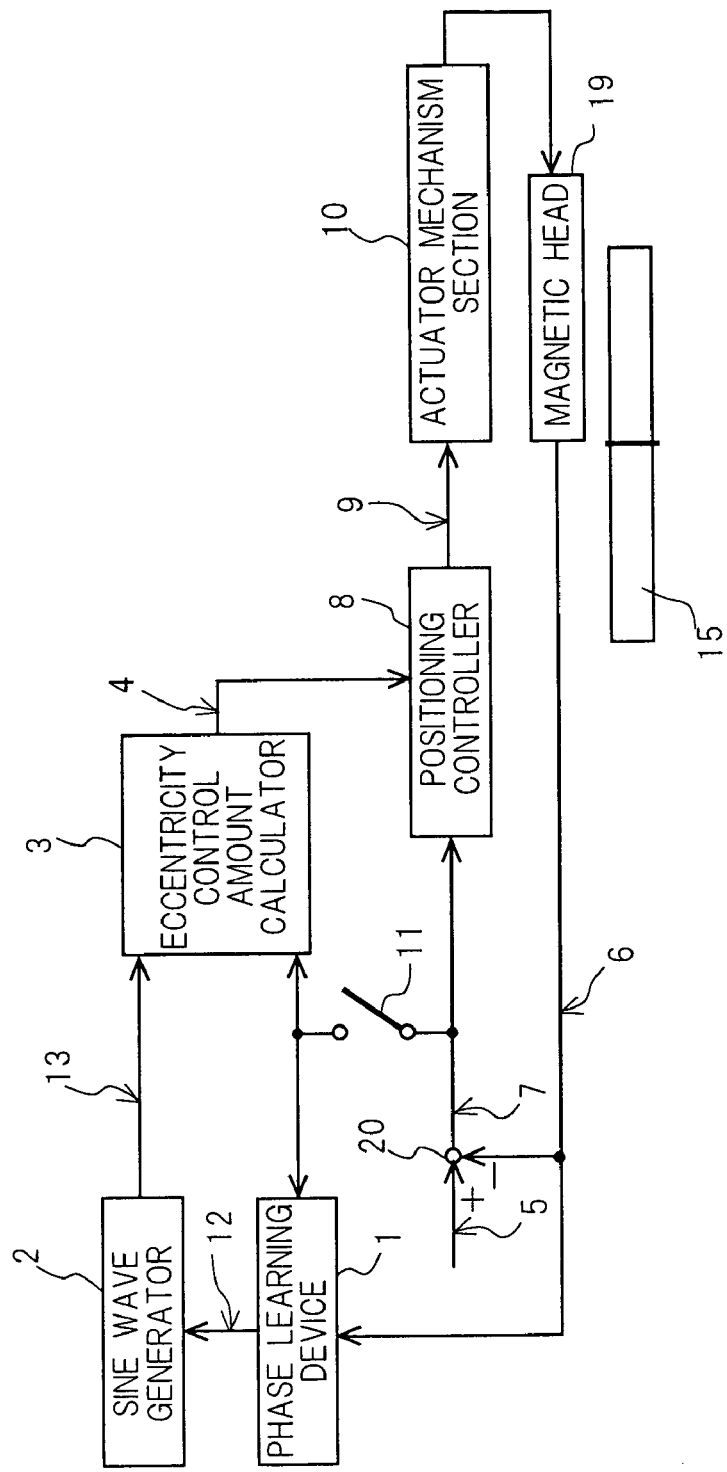
FIG. 1 is a block diagram showing a magnetic head positioning control apparatus of a magnetic disk apparatus according to a first embodiment of the invention.

FIG. 1 is a block diagram showing a magnetic disk apparatus according to the invention. FIG. 2A is a graph of which the horizontal axis indicates the revolution angle (degree) of a magnetic disk, and the vertical axis indicates the position of a magnetic head, and FIG. 2B is a graph of which the horizontal axis indicates the revolution angle (degree) of the magnetic disk, and the vertical axis indicates a servo information number. FIG. 3A is a plan view showing a magnetic disk 15 having concentric tracks T0–Tn and servo information regions S0–SN, and FIG. 3B is an enlarged partial view of the magnetic disk 15 showing the tracks T0, T1, T2, . . . and the servo information regions S0–SN. In the following description, the tracks T0–Tn can be described as track numbers T0–Tn, and the servo information regions S0–SN can be described as servo information numbers S0–SN; that is, the same reference numeral is used in two senses. When the magnetic head presents at a predetermined position on the magnetic disk revolving in an off-centered state, a plurality of tracks transverse under the magnetic head. The "position of magnetic head" in FIG. 2A is represented by the track number T0, T1, . . . of a track transversing the magnetic head.

In FIG. 1, a head position signal 6 indicating the position of the magnetic head 19 on the magnetic disk 15 is applied to a phase learning device 1, and also applied to a subtractor 20. In the subtractor 20, the above-mentioned head position signal 6 is subtracted from a target position signal 5 representing a position intending the head 19 to place, whereby a position error signal 7 is outputted. The position error signal 7 is applied to a learning switch 11 which is closed at the start-up of the magnetic disk apparatus, and to a positioning controller 8. The output of the learning switch 11 is applied to the phase learning device 1 and an eccentricity control amount calculator 3. A magnetic head control amount signal 9 which is the output of the positioning controller 8 is applied to an actuator mechanism section 10.

Phase deviation amount data 12 which is the output of the phase learning device 1 is applied to a sine wave generator 2. An eccentricity synchronization sine wave signal 13 which is the output of the sine wave generator 2 is applied to the eccentricity control amount calculator 3. An eccentricity control amount signal 4 which is the output of the eccentricity control amount calculator 3 is applied to the positioning controller 8.

In FIG. 3A, track numbers T0, T1, T2, T3, . . . Tn are numbers provided respectively to a large number of concentric tracks of the magnetic disk 15. The track number T0 indicates the number of the outermost track, while the other tracks are provided with track numbers T1, T2, T3, . . . , Tn which are natural numbers towards the innermost track. When the magnetic disk is off-centered, as shown in FIG. 2A, the track number of the track traced by the magnetic head 19 located at a constant position on the magnetic disk 15 varies in the form of a sine wave 6A within a constant range from Ta to Tb. Several ten tracks present between the track number Ta and Tb at maximum. One period of the sine wave 6A equals the time of one revolution of the magnetic disk.

In FIG. 3A, each of the tracks T0–Tn of the magnetic disk 15 is provided with (N+1) servo information regions S0–SN, where servo information is recorded in advance. N is the maximum servo information number which is, for example, several hundreds. The servo information regions S0–SN of the tracks T0–Tn are approximately adjacent to each other in the radial direction, whereby the servo information regions S0–SN form warped band regions as shown in FIG. 3A. The servo information in the servo information regions S0–SN provided in each of the concentric tracks are provided with natural numbers from 0 to N, which are denoted as servo information numbers S0–SN. FIG. 3B shows the relation between the tracks T0–T3 and the servo information regions S0, S1, and S2 at an enlarged scale. A sector data region 16 is a section where a user can record data.

The servo information number S0–SN detected by the magnetic head 19 located at a predetermined position on the revolving magnetic disk 15 varies from 0 to N in each revolution of the magnetic disk 15 as shown in FIG. 2B. When the magnetic disk 15 rotates successively, a signal indicating the change of the servo information numbers S0–SN has the form of a sawtooth wave 17. The sine wave 6A in FIG. 2A and the sawtooth wave 17 in FIG. 2B are contained in the head position signal 6, and both have the same period. The phase difference $\Phi$ between the sine wave 6A and the sawtooth wave 17 is referred to as a "phase deviation amount $\Phi$".

The operation of the apparatus according to the present embodiment is described below with reference to FIG. 1 and FIG. 2. Described first is the operation when the apparatus is started (at startup). At start-up, the magnetic head 19 is located at a predetermined position of the magnetic disk. The magnetic head 19 detects the position of the magnetic head 19 on the magnetic disk 15 on the basis of the track number T detected by the magnetic head 19, and thereby outputs a head position signal 6. When the magnetic disk 15 is off-centered, the track number T varies between Ta and Tb, while the change relative to the revolution angle of the magnetic disk 15 becomes a sine wave 6A. In the subtractor 20, the head position signal 6 is subtracted from the target position signal 5, whereby a position error signal 7 is outputted as the subtraction result. The position error signal 7 is applied to the positioning controller 8 and the learning switch 11. The position error signal 7 is applied through the learning switch 11 which is closed at start-up, to the phase learning device 1 and the eccentricity control amount calculator 3. In the phase learning device 1, the servo information number Sa where the track number T becomes the maximum value Tb is acquired in each revolution of the magnetic disk 15. The magnetic disk 15 revolves for a predetermined numbers of turns, whereby the average of the servo information numbers Sa obtained in respective revolutions is calculated. As a result, the phase deviation amount Φ between the sine wave 6A of the change of the track number T due to the eccentricity of the magnetic disk 15 and the sawtooth wave 17 of the change of the servo information number S is obtained by Equation (1).

101 =(servo information number where the track number indicating the head position becomes maximum)(3×N÷4)     (1)

N is the maximum servo information number. A phase deviation amount signal 12 representing the phase deviation amount Φ is outputted from the phase learning device 1, and then applied to the sine wave generator 2. The sine wave generator 2 outputs an eccentricity synchronization sine wave signal 13 having the value expressed by sin (2πf×(k φ)÷N) at a phase corresponding to the phase deviation amount Φ, and applies the signal to the eccentricity control amount calculator 3. Here, "k" represents the k-th servo information number among the servo information numbers S0–SN. When 2πf(k φ) is divided by N, an eccentricity synchronization sine wave signal 13 is obtained for each servo information number. The eccentricity control amount calculator 3 multiplies the value of the eccentricity synchronization sine wave signal 13 by a predetermined weight coefficient A, and thereby calculates an eccentricity control amount ur as shown in Equation (2).

$$ur = A \times \sin(2\pi f \times (k\Phi) \div N) \quad (2)$$

An eccentricity control amount signal 4 indicating the eccentricity control amount ur is applied to the positioning controller 8. Further, the eccentricity control amount calculator 3 performs a multiplication and summation operation of Equation (3) on the value Er of the position error signal 7 which is the difference between the target position signal 5 and the head position signal 6, and the value of the eccentricity synchronization sine wave signal 13 over the servo information number k, and thereby obtains a multiplication and summation operation value I.

$$I = \sum_{k=0}^{N} \{Er \times \sin(2\pi f \times (k\Phi) \div N)\} \quad (3)$$

The multiplication and summation operation value I is multiplied by a predetermined constant gain G, and an operation of Equation (4) is performed in each revolution of the magnetic disk 15, whereby the weight coefficient A is renewed.

$$A = A \, G \times I \quad (4)$$

The above-mentioned positioning controller 8 calculates a control amount used when normal feedback control for causing the magnetic head 19 to follow a desired track is performed, from the above-mentioned position error signal 7. In the present embodiment, the description of normal feedback control is omitted. The calculated control amount is added to the above-mentioned eccentricity control amount signal 4, whereby a magnetic head control amount signal 9 is calculated. The magnetic head control amount signal 9 is applied to the actuator mechanism section 10, whereby the positioning of the magnetic head 19 is performed.

Further, the above-mentioned phase learning device 1 acquires the above-mentioned position error signal 7 in every predetermined numbers of revolution of the magnetic disk 15, acquires the signal of the servo information number 14 where the track number T becomes the maximum in each revolution of the magnetic disk 15, and thereby corrects the above-mentioned phase deviation amount signal 12.

In seek and settling, that is, when the magnetic head 19 accesses the target track, the learning switch 11 is turned OFF, and the calculation of the weight coefficient A and the correction of the phase deviation amount signal 12 are suspended. Then, the eccentricity control amount ur is calculated using a weight coefficient A and a phase deviation amount Φ which are constant. Consequently, the eccentricity control amount of the magnetic head is calculated at a high speed, and fast position control of the magnetic head 19 can be performed at a high speed based on this calculated value. Therefore, the degradation of control performance due to control delay caused by a long calculation time can be prevented, and thereby fast and precise control is realizable.

According to the present embodiment, in the start-up of the magnetic disk apparatus, the position of the magnetic head is measured in the state that the magnetic head 19 is not controlled, whereby the servo information number which indicates the maximum value in each revolution of the magnetic disk 15 is obtained accurately. Further, in seek and settling, the calculation of the weight coefficient and the re-calculation of the phase relation between the servo information number and the eccentricity are stopped, whereby the eccentricity is compensated using a weight coefficient and a phase deviation correction which are constant. This provides stable control performance even when the variation in the position error from the target position of the magnetic head is large, for example, in the seek and the settling of the magnetic head.

Second Embodiment

A second embodiment of the invention is described below with reference to FIG. 1, FIG. 4A, and FIG. 4B. The vertical axis of FIG. 4A indicates the position error of a magnetic head, while the horizontal axis indicates the revolution angle of the magnetic disk 15. The vertical axis of FIG. 4B indicates the servo information number, while the horizontal axis indicates the above-mentioned revolution angle.

FIG. 4A and FIG. 4B are diagrams showing the relations of the change of the position error of the magnetic head 19 and the change of the servo information number on the magnetic disk 15 in a magnetic disk apparatus according to the second embodiment of the invention. In the present embodiment, the position error E of the magnetic head 19 relative to a target track is obtained on the basis of the track number T. When the magnetic disk 15 is off-centered, the position error E varies in the form of a sine wave.

In the start-up of the magnetic disk apparatus, in the state that normal feedback control is performed, the phase learning device 1 receives a position error signal 7, and introduces a signal of the servo information number Sb which indicates the minimum position error E1 in each revolution of the magnetic disk 15. The magnetic disk 15 is rotated by a plurality of rotations, and the servo information number is measured in each revolution, and after that, the average value of these servo information numbers is calculated. Successively, the phase deviation amount Φ between the eccentricity of the magnetic disk 15 and the change of the servo information number is calculated by Equation (5).

$$\Phi=(\text{servo information number which indicates the minimum value of the position error})(3\times N \div 4) \quad (5)$$

N is the maximum servo information number.

When the positioning of the magnetic head 19 is performed, the sine wave generator 2 generates an eccentricity synchronization sine wave signal 13 at a phase corresponding to the above-mentioned phase deviation amount $\Phi$, and applies the signal to the eccentricity control amount calculator 3.

The eccentricity control amount calculator 3 performs the calculation of Equation (2) of multiplying the above-mentioned eccentricity synchronization sine wave signal 13 by a weight coefficient A, thereby obtains an eccentricity control amount ur, and then outputs an eccentricity control amount signal 4 representing the eccentricity control amount ur.

The eccentricity control amount signal 4 is applied to the positioning controller 8. The eccentricity control amount calculator 3 performs a multiplication and summation operation as shown by Equation (3) on the position error signal 7 which is the difference between the target position signal 5 and the head position signal 6 and the eccentricity synchronization sine wave signal 13 over the servo information numbers, and thereby obtains a multiplication and summation operation value I.

The multiplication and summation operation value I is multiplied by a gain G in each revolution of the magnetic disk 15, whereby the weight coefficient A is renewed as shown in Equation (4).

The positioning controller 8 receives the position error signal 7, and calculates a normal feedback control amount, then adds this amount to the above-mentioned eccentricity control amount, and thereby obtains a magnetic head control amount signal 9. The magnetic head control amount signal 9 is applied to the actuator mechanism section 10, whereby the positioning of the magnetic head 19 is performed.

The phase learning device 1 measures the position error signal 7 in every predetermined numbers of revolution of the magnetic disk 15. The servo information number which indicates the minimum value of the position error is introduced in each revolution of the magnetic disk 15, and correction of the above-mentioned phase deviation amount signal 12 is performed. Consequently, the eccentricity control amount of the magnetic head 19 is calculated at a high speed, and position control of the magnetic head 19 can be performed based on this calculated value. Therefore, the degradation of control performance due to control delay caused by a long calculation time can be prevented, and thereby fast and precise control is realizable.

According to the present embodiment, the position error is observed in the state that normal feedback control is performed, and the servo information number which indicates the minimum value is introduced in each revolution of the magnetic disk 15, whereby the phase deviation amount $\Phi$ is obtained more accurately. When normal feedback control is solely performed, a position error remains corresponding to the eccentricity component of the disk, then in the phase thereof, a phase deviation corresponding to a time delay of the control amount calculation occurs relative to the intrinsic eccentricity phase of the disk. In the present embodiment, since the eccentricity is measured during the feedback control, the phase deviation amount is obtained more accurately.

Third Embodiment

A third embodiment of the present invention is described below with reference to FIG. 5 and FIG. 6.

Figure 5:
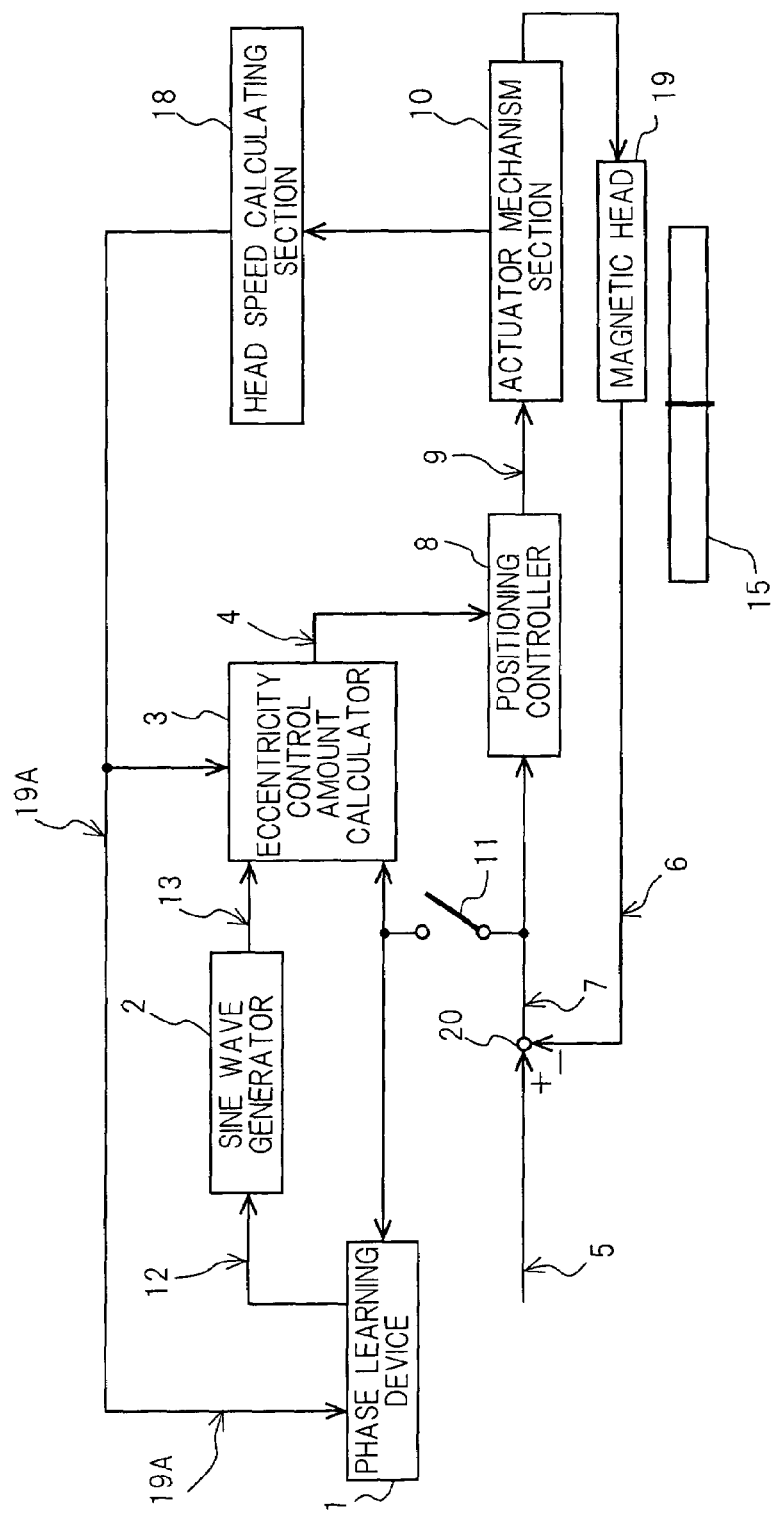
FIG. 5 is a block diagram showing a magnetic head positioning control apparatus in a magnetic disk apparatus according to a third embodiment of the invention.

FIG. 5 is a block diagram showing a magnetic head positioning control apparatus in a magnetic disk apparatus according to the third embodiment.

FIG. 6A is a diagram showing the change of the traveling speed of the magnetic head relative to the revolution angle of the magnetic disk in the magnetic disk apparatus according to the present embodiment, and FIG. 6B is a diagram showing the change of the servo information number.

In FIG. 5, the head position signal 6 outputted from the magnetic head 19 is subtracted from the target position signal 5 in the subtractor 20, whereby a position error signal 7 is outputted. The position error signal 7 is applied to the learning switch 11 and the positioning controller 8. The output of the positioning controller 8 is applied to the actuator mechanism section 10, whereby the actuator mechanism section 10 drives the magnetic head 19. The traveling speed of the magnetic head 19 is calculated by a head speed calculating section 18 on the basis of the output of the actuator mechanism section 10. A head speed signal 19A which is the output of the head speed calculating section 18 is applied to the phase learning device 1 and the eccentricity control amount calculator 3. The output of the learning switch 11 is applied to the phase learning device 1 and the eccentricity control amount calculator 3. The output of the phase learning device 1 is applied to the sine wave generator 2, and the output of the sine wave generator 2 is applied to the eccentricity control amount calculator 3.

In the start-up of the magnetic disk apparatus, in the state that normal feedback control is performed, the phase learning device 1 receives the head speed signal 19A. The phase learning device 1 introduces the servo information number Sc corresponding to the maximum value of the traveling speed of the magnetic head as shown in FIG. 6B in each revolution of the magnetic disk 15, and after measurement of the servo information numbers Sc for a predetermined numbers of revolution, then calculates the average of the servo information numbers Sc. The phase deviation amount $\Phi$ between the change of the traveling speed of the magnetic head 19 (the eccentricity of the magnetic disk 15) and the change of the servo information number, as shown in FIG. 6A and FIG. 6B, is calculated according to Equation (6).

$$\Phi=(\text{servo information number } Sc)(N\div 2) \quad (6)$$

When the magnetic disk apparatus performs the positioning of the magnetic head 19, the sine wave generator 2 applies an eccentricity synchronization sine wave signal 13 to the eccentricity control amount calculator 3 at a phase corresponding to the above-mentioned phase deviation amount $\Phi$. The eccentricity control amount calculator 3 performs the calculation of Equation (2) of multiplying the above-mentioned eccentricity synchronization sine wave-signal 13 by a weight coefficient A, thereby obtains an eccentricity control amount ur, and then outputs an eccentricity control amount signal 4.

The eccentricity control amount signal 4 is applied to the positioning controller 8. The eccentricity control amount calculator 3 performs a multiplication and summation operation of Equation (3) on the position error signal 7 which is the difference between the target position signal 5 and the head position signal 6 and the eccentricity synchronization sine wave signal 13 over the servo information numbers, and thereby obtains a multiplication and summation operation value I. Further, the multiplication and summation operation value I is multiplied by a gain G in each revolution of the spindle motor, whereby the weight coefficient A is renewed as shown in Equation (4).

The above-mentioned positioning controller 8 calculates a normal feedback control amount from the above-mentioned position error signal 7, and adds it to the above-mentioned eccentricity control amount signal 4, and thereby obtains a magnetic head control amount signal 9. The magnetic head control amount signal 9 is applied to the actuator mechanism section 10, whereby the positioning of the magnetic head 19 is performed.

Further, the above-mentioned phase learning device 1 measures the above-mentioned position error signal 7 in every predetermined numbers of revolution of the magnetic disk. Furthermore, the phase learning device 1 acquires a signal of the servo information number Sc corresponding to the maximum value of the traveling speed of the magnetic head in each revolution of the magnetic disk, and thereby corrects the above-mentioned phase deviation amount signal 12.

The head speed calculating section 18 obtains the traveling speed of the magnetic head on the basis of the counter electromotive voltage appearing in a voice coil motor of the actuator mechanism section 10, and thereby outputs a head speed signal 19A. This counter electromotive voltage is proportional to the traveling speed of the magnetic head. The head speed signal 19A is applied to the phase learning device 1 and the eccentricity control amount calculator 3. In the sector data region 16 (FIG. 3B) where no servo information is present, the eccentricity control amount calculator 3 calculates the eccentricity control amount 4, and thereby outputs and applies an eccentricity control amount signal 4 to the positioning controller 8. The positioning controller 8 calculates the sum between the position error signal 7 and the above-mentioned eccentricity control amount signal 4, and thereby calculates a magnetic head control amount. The positioning controller 8 generates a magnetic head control amount signal 9 from the magnetic head control amount, then applies the signal to the actuator mechanism section 10, and thereby performs the positioning of the magnetic head.

In the present embodiment, the traveling speed of the magnetic head is observed in the state that normal feedback control is performed. The servo information number which indicates the maximum value of the traveling speed of the magnetic head is introduced in each revolution of the magnetic disk, whereby the phase deviation amount is obtained more accurately. Further, the eccentricity is compensated in a predetermined position between a servo information and another servo information, using the traveling speed of the magnetic head calculated by the above-mentioned head speed calculating section 18, whereby the eccentricity control amount for the magnetic head is calculated accurately, and the control performance is improved.

Fourth Embodiment

Figure 7:
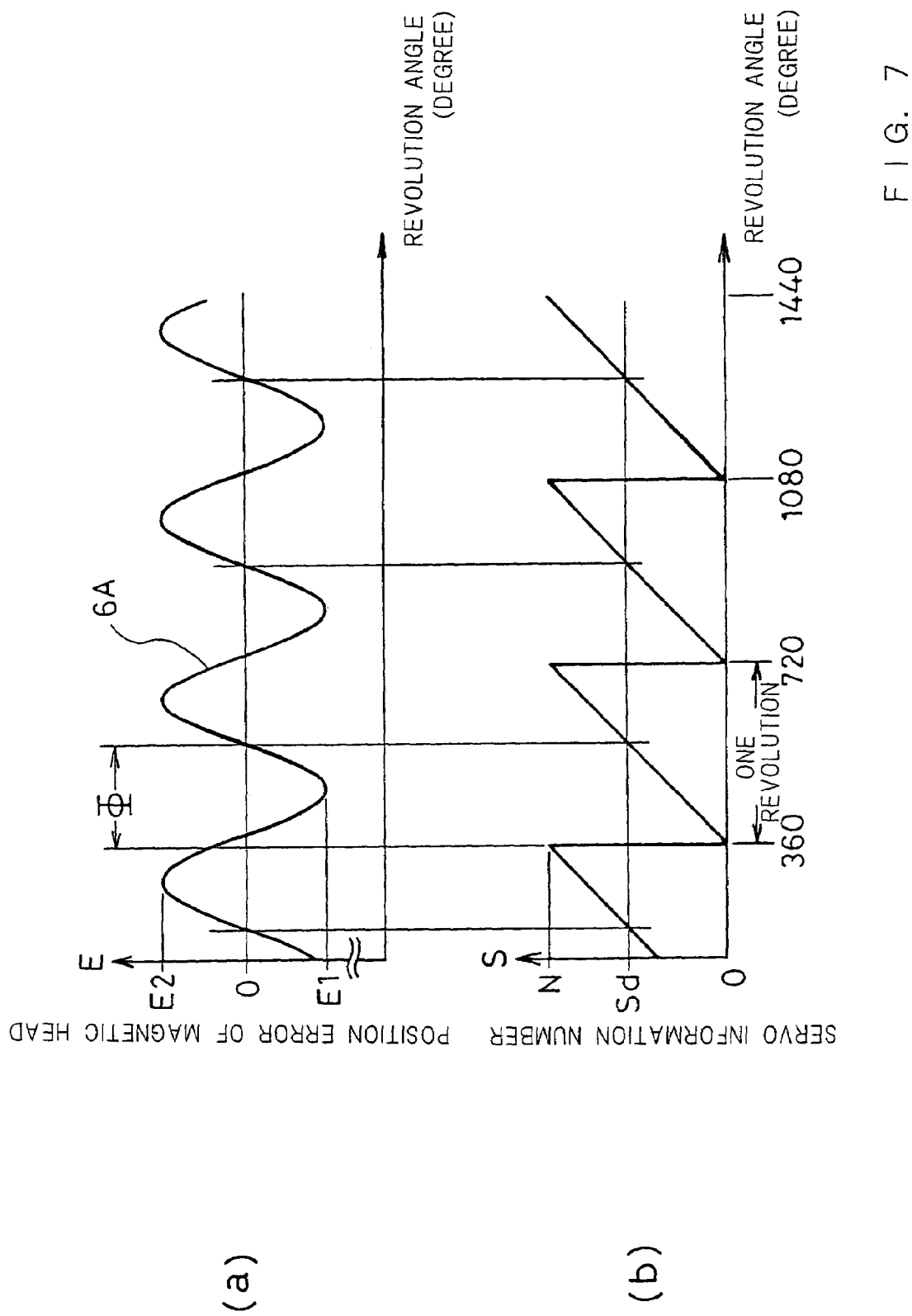
FIG. 7A is a waveform diagram showing the change of the position error of a magnetic head relative to the revolution angle in a magnetic disk apparatus according to a fourth embodiment of the invention.
FIG. 7B is a waveform diagram showing the change of the above-mentioned servo information number relative to the revolution angle.

A fourth embodiment of the present invention is described below with reference to FIG. 1 and FIG. 7.

FIG. 7A is a diagram showing the change of the position error of the magnetic head 19 relative to the revolution angle in a magnetic disk apparatus according to a fourth embodiment, and FIG. 7B is a diagram showing the change of the servo information number S0–SN. In FIG. 7A, the middle position between the magnetic head position errors E1 and E2 is referred to as the "zero level", and the point where the waveform 6A crosses the zero level is referred to as a zero crossing point. The point where the waveform 6A crosses the zero level in the increasing state is referred to as a "zero crossing point in the positive direction".

In FIG. 1, in the start-up of the magnetic disk apparatus, in the state that normal feedback control is performed, the phase learning device 1 receives a position error signal 7 applied through the switch 11, and observes the position error of the magnetic head. That is, the servo information number Sd corresponding to the zero crossing point in the positive direction is introduced in each revolution of the magnetic disk 15. After the servo information numbers Sd for a predetermined numbers of revolution are introduced, the average of the introduced servo information numbers Sd is calculated. Then, the phase deviation amount Φ between the eccentricity of the magnetic disk 15 and the change of the servo information number is calculated according to Equation (7).

$$\Phi = \text{(servo information number which indicates the zero crossing in the positive direction of the position error)} \quad (7)$$

When the magnetic disk apparatus performs the positioning of the magnetic head 19, the sine wave generator 2 applies an eccentricity synchronization sine wave signal 13 to the eccentricity control amount calculator 3 at a phase corresponding to the above-mentioned phase deviation amount Φ. The eccentricity control amount calculator 3 performs the calculation of Equation (2) of multiplying the above-mentioned eccentricity synchronization sine wave signal 13 by a weight coefficient A, thereby obtains an eccentricity control amount ur, and then outputs an eccentricity control amount signal 4.

The eccentricity control amount signal 4 is applied to the positioning controller 8. When the switch 11 is closed, the position error signal 7 which is the difference between the target position signal 5 and the head position signal 6 is applied to the eccentricity control amount calculator 3. The eccentricity control amount calculator 3 performs a multiplication and summation operation of Equation (3) on the position error signal 7 and the eccentricity synchronization sine wave signal 13 over the individual servo information numbers, and thereby calculates a multiplication and summation operation value I.

The multiplication and summation operation value I is multiplied by a gain G in each revolution of the spindle motor, whereby the weight coefficient A is renewed as shown in Equation (4).

The above-mentioned positioning controller 8 calculates a normal feedback control amount from the above-mentioned position error signal 7, then adds this amount to the above-mentioned eccentricity control amount, and thereby calculates the control amount for the magnetic head 19. The control amount is applied as a magnetic head control amount signal 9 to the actuator mechanism section 10, whereby the positioning of the magnetic head is performed.

The above-mentioned phase learning device 1 measures the above-mentioned position error 7 in every predetermined numbers of revolution of the magnetic disk 15, introduces the servo information number corresponding to the maximum value of the track number in each revolution of the magnetic disk 15, and thereby corrects the above-mentioned phase deviation amount signal 12.

According to the present embodiment, the position error signal is observed in the state that normal feedback control is performed, whereby the servo information number corresponding to the zero crossing point in the positive direction is measured in each revolution of the magnetic disk. Thus, when the zero crossing point is detected, the servo information number does not need to be measured for one revolution, whereby the calculation is speeded up.

Fifth Embodiment

Figure 8:
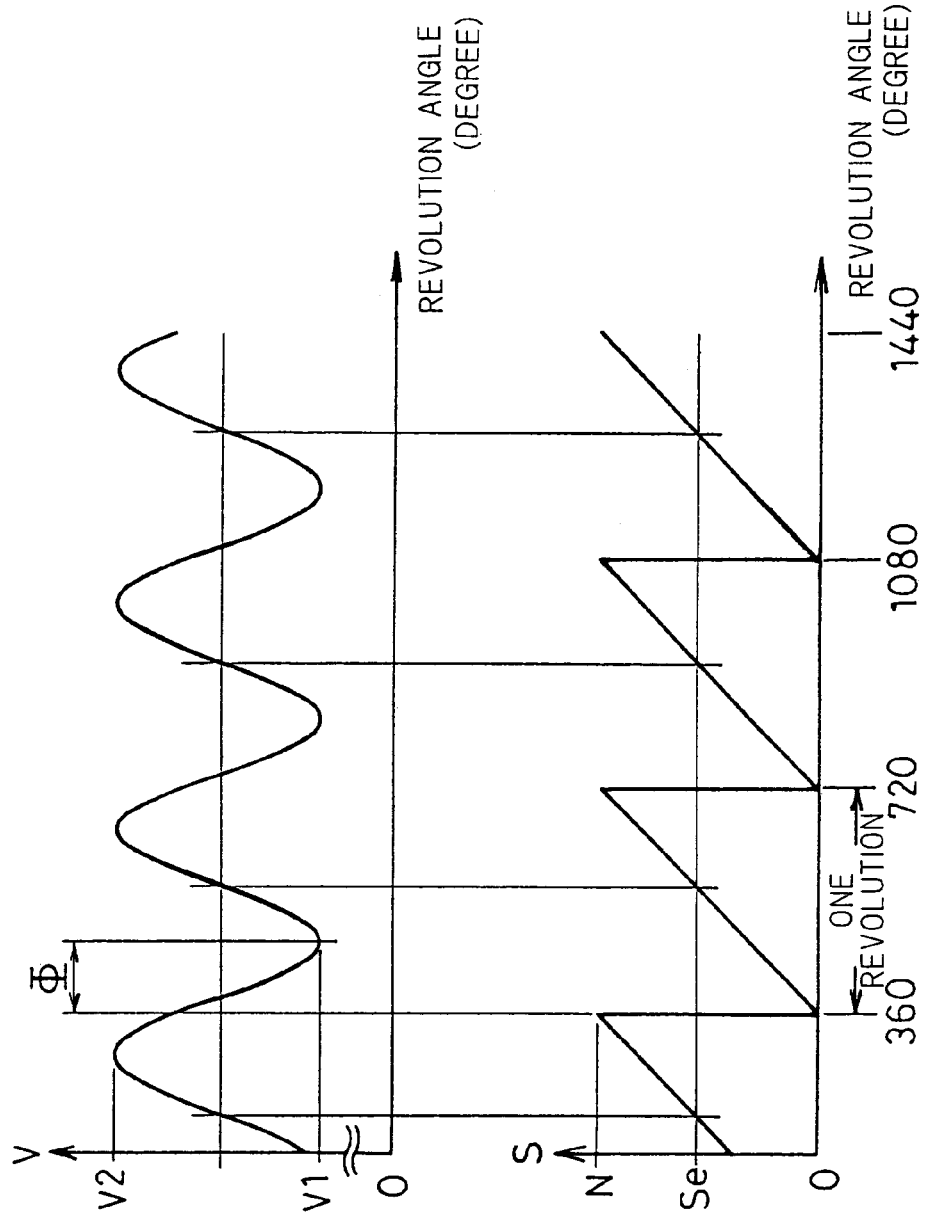
FIG. 8A is a waveform diagram showing the change of the traveling speed of a magnetic head relative to the revolution angle in a magnetic disk apparatus according to a fifth embodiment of the invention.
FIG. 8B is a waveform diagram showing the change of the above-mentioned servo information number relative to the revolution angle.

A fifth embodiment of the present invention is described below with reference to FIG. 5 and FIG. 8.

FIG. 8A is a diagram showing the change of the traveling speed of the magnetic head 15 relative to the revolution angle in a magnetic disk apparatus according to the fifth embodiment, and FIG. 8B is a diagram showing the change of the servo information number.

In the start-up of the magnetic disk apparatus, in the state that normal feedback control is performed, the phase learning device 1 of FIG. 5 receives a head speed signal 19A indicating the traveling speed of the magnetic head 19, from the head speed calculating section 18, and thereby observe the traveling speed of the magnetic head 19. As shown in FIG. 8, the phase learning device 1 introduces the servo information number Se corresponding to the zero crossing point in the positive direction in each revolution of the magnetic disk 15. Then, the average of the servo information numbers Se for a predetermined numbers of revolution which have been obtained during the predetermined numbers of revolution of the magnetic disk 15 is calculated. Then, the phase deviation amount Φ between the change of the traveling speed of the magnetic head and the change of the servo information number is calculated according to Equation (8).

$$\Phi = (\text{servo information number } Se)(N \div 4) \tag{8}$$

In the magnetic disk apparatus according to the present embodiment, in the case that the positioning of the magnetic head 19 is performed, the sine wave generator 2 generates an eccentricity synchronization sine wave signal 13 having a phase corresponding to the above-mentioned phase deviation amount signal 12, and applies the signal to the eccentricity control amount calculator 3. The eccentricity control amount calculator 3 multiplies the above-mentioned eccentricity synchronization sine wave signal 13 by a weight coefficient A, and thereby calculates an eccentricity control amount ur according to Equation (2).

An eccentricity control amount signal 4 indicating the eccentricity control amount ur is applied to the positioning controller 8. The eccentricity control amount calculator 3 receives a position error signal 7 which is the difference between the target position signal 5 and the head position signal 6, through the switch 11 which is closed, and at the same time, receives the eccentricity synchronization sine wave signal 13. The eccentricity control amount calculator 3 performs a multiplication and summation operation of Equation (3) over the individual servo information numbers Se, and thereby calculates a multiplication and summation operation value I.

The eccentricity control amount calculator 3 multiplies the above-mentioned multiplication and summation operation value I by a gain G in each revolution of the magnetic disk 15 as shown in Equation (4), and thereby renews the weight coefficient A.

The positioning controller 8 calculates a control amount for normal feedback control from the position error signal 7, and adds this amount to the above-mentioned eccentricity control amount, thereby calculates a magnetic head control amount. The magnetic head control amount is applied to the actuator mechanism section 10, and the positioning of the magnetic head 19 is performed.

Further, the above-mentioned phase learning device 1 measures the above-mentioned position error signal 7 in every predetermined numbers of revolution of the magnetic disk 15, introduces the servo information number Se in each revolution of the magnetic disk 15, and thereby corrects the above-mentioned phase deviation amount Φ.

According to the present embodiment, the magnetic head speed is observed in the state that normal feedback control is performed, and the servo information number corresponding to the zero crossing point in the positive direction is measured in each revolution of the magnetic disk. Thus, by detecting the zero crossing point, the servo information number does not need to be measured for one revolution, whereby the calculation is speeded up.

Sixth Embodiment

Figure 9:
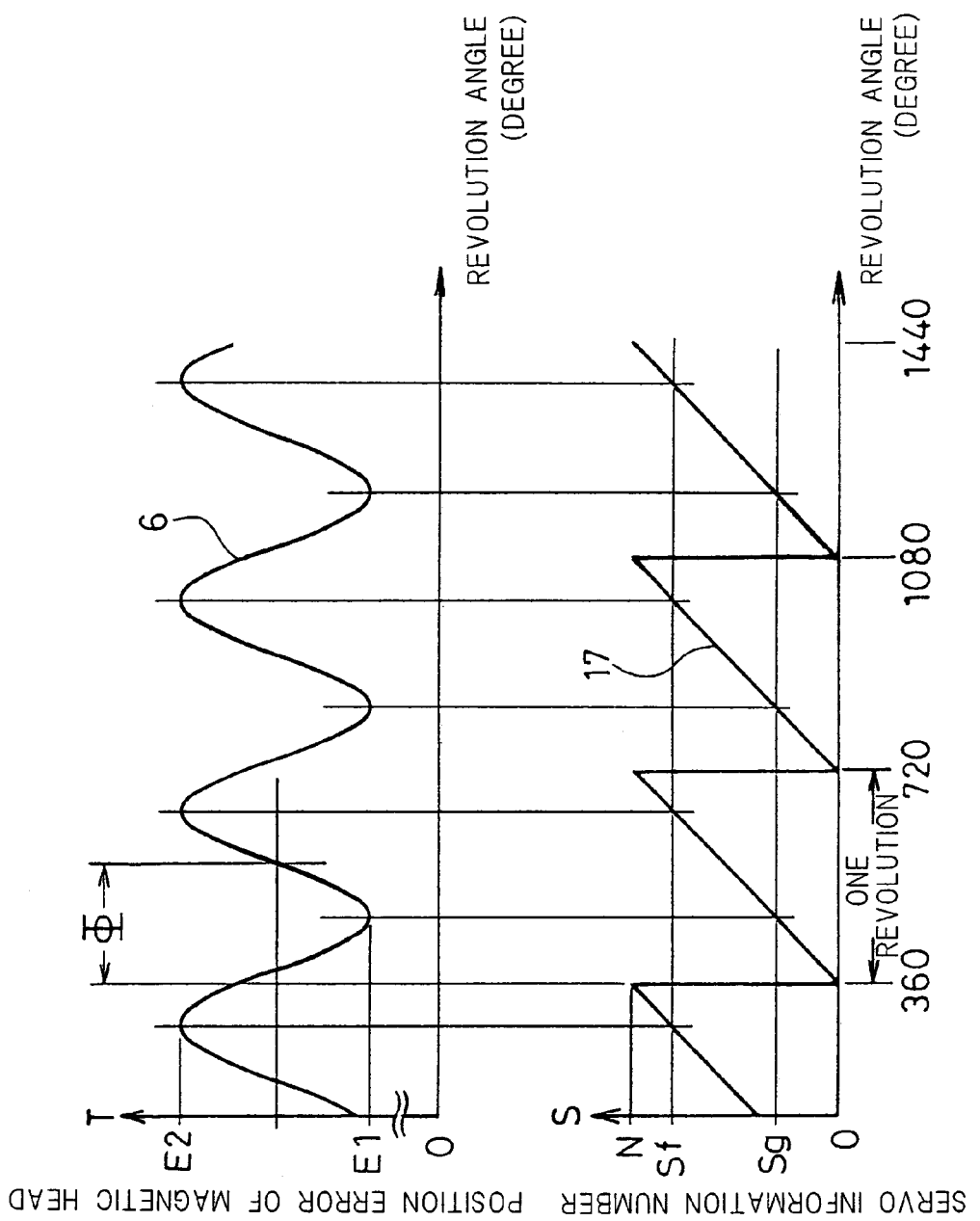
FIG. 9A is a waveform diagram showing the change of the position error of a magnetic head relative to the revolution angle in a magnetic disk apparatus according to a sixth embodiment of the invention.
FIG. 9B is a waveform diagram showing the change of the above-mentioned servo information number relative to the revolution angle.
Figure 10:
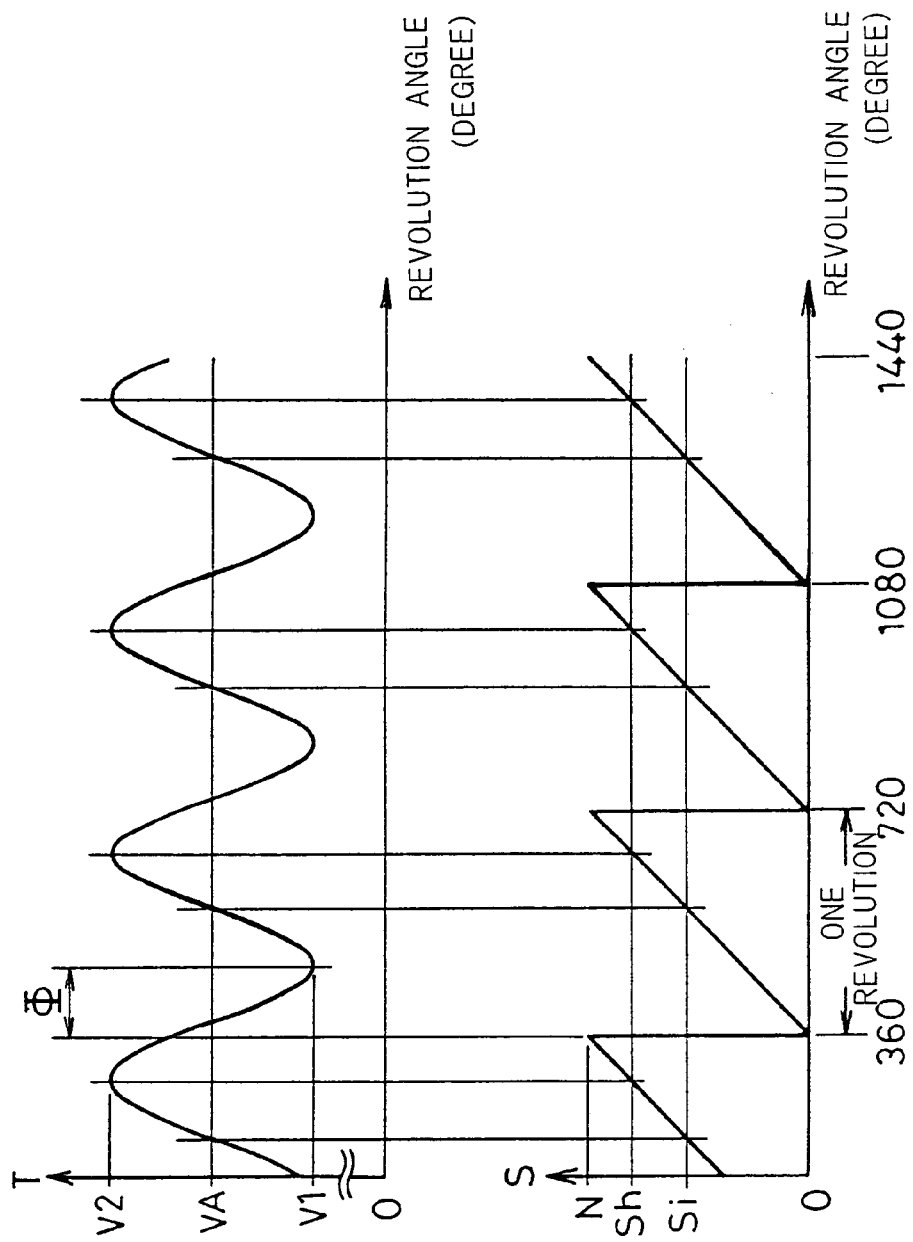
FIG. 10A is a waveform diagram showing the change of the traveling speed of a magnetic head relative to the revolution angle in a magnetic disk apparatus according to a seventh embodiment of the invention.
FIG. 10B is a waveform diagram showing the change of the above-mentioned servo information number relative to the revolution angle.

A sixth embodiment of the invention is described below with reference to FIG. 1 and FIG. 9.

FIG. 9A is a diagram showing the change of the position error of the magnetic head relative to the revolution angle in a magnetic disk apparatus according to a sixth embodiment, and FIG. 9B is a diagram showing the change of the servo information number relative to the revolution angle.

In the start-up of the magnetic disk apparatus, in the state that normal feedback control is performed, the phase learning device 1 shown in FIG. 1 receives a position error signal 7 which indicates the position error of the magnetic head 19 and which is applied through the switch 11, and measures the position error of the magnetic head 19. The phase learning device 1 introduces the servo information numbers Sf and Sg corresponding respectively to the maximum value E2 and the minimum value E1 of the position error in each revolution of the magnetic disk 15. When the difference between the servo information number Sf corresponding to the maximum value E2 and the servo information number Sg corresponding the minimum value E1 falls within a predetermined range, the phase learning device 1 uses the servo information number Sf of the maximum value E2, and calculates the phase deviation amount Φ between the position error of the magnetic head 19 and the servo information number Sf according to Equation (9).

$$\Phi = (\text{servo information number } Sf)(N \div 4) \tag{9}$$

In the magnetic disk apparatus according to the present embodiment, when the positioning of the magnetic head 19 is performed, the sine wave generator 2 generates an eccentricity synchronization sine wave signal 13 having a phase corresponding to the above-mentioned phase deviation amount Φ, and applies to the eccentricity control amount calculator 3. The eccentricity control amount calculator 3 calculates Equation (2) of multiplying the value of the above-mentioned eccentricity synchronization sine wave signal 13 by a weight coefficient A, obtains an eccentricity control amount ur, and outputs an eccentricity control amount signal 4.

The eccentricity control amount signal 4 is applied to the positioning controller 8. A position error signal 7 which is the difference between the target position signal 5 and the head position signal 6 is applied through the switch 11 to the eccentricity control amount calculator 3. The eccentricity control amount calculator 3 performs a multiplication and summation operation of Equation (3) on the position error signal 7 and the eccentricity synchronization sine wave signal 13 over the individual servo information numbers, and thereby calculates a multiplication and summation operation value I.

The eccentricity control amount calculator 3 multiplies the multiplication and summation operation value I by a predetermined constant gain G in each revolution of the magnetic disk 15, and thereby renews the weight coefficient A as shown in Equation (4).

The positioning controller 8 obtains a control amount for normal feedback control, from the position error signal 7, then adds a control amount signal to the above-mentioned eccentricity control amount signal 4, and thereby obtains a magnetic head control amount signal 9. The positioning controller 8 applies the magnetic head control amount signal 9 to the actuator mechanism section 10, whereby the positioning of the magnetic head 19 is performed.

The above-mentioned phase learning device 1 introduces the above-mentioned position error signal 7 in every predetermined numbers of revolution of the magnetic disk 15, introduces the servo information number Sf in each revolution of the magnetic disk 15, and thereby corrects the above-mentioned phase deviation amount Φ.

According to the present embodiment, the position error of the magnetic head is observed in the state that normal feedback control is performed, and the servo information numbers 7 indicating the maximum value and the minimum value are introduced in each revolution of the magnetic disk. When the difference between the servo information number indicating the maximum value and the servo information number indicating the minimum value falls within a predetermined range, the servo information number indicating the maximum value is rendered effective. Consequently, the calculation of the average of the servo information numbers obtained during certain numbers of revolution of the magnetic disk is not required. Thereby the speedup of the calculation is realized.

Seventh Embodiment

A seventh embodiment of the present invention is described below with reference to FIG. 5, FIG. 10A, and FIG. 10B.

FIG. 10A and FIG. 10B are diagrams respectively showing the change of the traveling speed of the magnetic head and the change of the servo information number relative to the revolution angle in a magnetic disk apparatus according to the present embodiment.

In the start-up of the magnetic disk apparatus, in the state that normal feedback control is performed, the phase learning device 1 shown in FIG. 5 receives a head speed signal 19A which indicates the traveling speed of the magnetic head and which is applied through the switch 11, and thereby detects the change of the traveling speed of the magnetic head 19. In FIG. 10A, the maximum traveling speed V2 and the minimum traveling speed V1 of the magnetic head 19 are detected in each revolution of the magnetic disk 15, whereby the average traveling speed VA of the maximum traveling speed V2 and the minimum traveling speed V1 is obtained. As shown in FIG. 10B, the servo information numbers Sh and Si corresponding respectively to the maximum traveling speed V2 and the average traveling speed VA are introduced into the phase learning device 1. When the difference between the servo information numbers Sh and Si falls within a predetermined range, the servo information number Sh corresponding to the maximum traveling speed V2 is used, whereby the phase deviation amount Φ between the change of the traveling speed of the magnetic head and the servo information number Sh is calculated according to Equation (10).

$$\Phi = (\text{servo information number } Sh)(N+2) \quad (10)$$

In the magnetic disk apparatus according to the present embodiment, when the positioning of the magnetic head 19 is performed, the sine wave generator 2 generates an eccentricity synchronization sine wave signal 13 having a phase corresponding to the above-mentioned phase deviation amount Φ, and applies the signal to the eccentricity control amount calculator 3. The eccentricity control amount calculator 3 calculates Equation (2) of multiplying the value of the above-mentioned eccentricity synchronization sine wave signal 13 by a weight coefficient A, obtains an eccentricity control amount ur, and thereby outputs an eccentricity control amount signal 4.

The eccentricity control amount signal 4 is applied to the positioning controller 8. A position error signal 7 which is the difference between the target position signal 5 and the head position signal 6 is applied through the switch 11 to the eccentricity control amount calculator 3. The eccentricity control amount calculator 3 performs a multiplication and summation operation of Equation (3) on the position error signal 7 and the eccentricity synchronization sine wave signal 13 over the individual servo information numbers, and thereby calculates a multiplication and summation operation value I.

The eccentricity control amount calculator 3 multiplies the multiplication and summation operation value I by a predetermined constant gain G in each revolution of the magnetic disk 15, and thereby renews the weight coefficient A as shown in Equation (4).

The positioning controller 8 obtains a control amount for normal feedback control, from the position error signal 7, then adds a control amount signal to the above-mentioned eccentricity control amount signal 4, and thereby obtains a magnetic head control amount signal 9. The magnetic head control amount signal 9 is applied to the actuator mechanism section 10, whereby the positioning of the magnetic head 19 is performed.

Further, the above-mentioned phase learning device 1 introduces the position error signal 7 in every predetermined numbers of revolution of the magnetic disk 15. The phase learning device 1 further introduces the servo information number Sh corresponding to the maximum traveling speed V2 in each revolution of the magnetic disk 15, and thereby corrects the above-mentioned phase deviation amount Φ.

According to the present embodiment, the magnetic head traveling speed is observed in the state that normal feedback control is performed, whereby the servo information numbers corresponding respectively to the maximum value of the magnetic head traveling speed and the zero crossing point are introduced. When the difference between the servo information number corresponding to the maximum value and the servo information number corresponding to the zero crossing point falls within a predetermined range, by rendering effective servo information number indicating the maximum value, measurement during certain numbers of revolution of the magnetic disk and averaging thereof are not required, and thus the calculation is speeded up.

In the above-mentioned embodiments, since the eccentricity control method for magnetic disk is realizable by a computer program, the eccentricity control method for magnetic disk according to the present invention can be recorded in a computer-controllable recording medium. The recording medium is, for example, a data recording apparatus comprising a flexible disk, a CD-ROM, a DVD, a magneto-optical disk, a removal hard disk, a flash memory, or the like.

INDUSTRIAL APPLICABILITY

As described above in detail in the embodiments, according to the present invention, since a control amount for compensating the eccentricity of a magnetic disk can be calculated at a high speed, degradation in the control performance due to control delay caused by insufficient calculation speed can be prevented. Stable control performance is obtained even in the case that in the position error from the target position of the magnetic head is large, for example, in the seek and the settling of the magnetic head.

The invention claimed is:

1. In a magnetic head positioning method in which servo information containing a series of servo information numbers disposed along each of a plurality of tracks having a series of track numbers on a magnetic disk is read by a magnetic head, and said magnetic head for recording and reproducing information onto or from the magnetic disk revolving according to the servo information is positioned at a target position, an eccentricity control method for magnetic disk comprising:
a phase learning step of learning a phase deviation amount representing the phase relation between a change in said servo information number read by said magnetic head and a change in the eccentricity amount of the magnetic disk;
a step of detecting a positioning error signal of said magnetic head on the basis of said phase deviation amount;
a step of generating a signal of sine wave in synchronization with the revolution frequency of the magnetic disk or of cosine wave having a phase difference of 90 degrees relative to said sine wave;
a step of obtaining a weight coefficient from said signal of sine wave or cosine wave and said positioning error signal of the magnetic head;
a step of obtaining an eccentricity compensation signal representing an eccentricity control amount by multiplying the signal of sine wave or cosine wave by said weight coefficient; and
a step of controlling the magnetic head by using said eccentricity compensation signal, and thereby compensating the eccentricity of the magnetic disk.

2. An eccentricity control method for magnetic disk according to claim 1,
characterized in that in said phase learning step, the servo information number at a position where the track number varying with respect to the position of the magnetic head becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

3. An eccentricity control method for magnetic disk according to claim 1,
characterized in that in said phase learning step, the servo information number at a position where the position error of the magnetic head with respect to a target track becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

4. An eccentricity control method for magnetic disk according to claim 1,
characterized in that in said phase learning step, the servo information number at a position where the traveling speed of the magnetic head following a target track becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

5. An eccentricity control method for magnetic disk according to claim 1,
characterized in that in said phase learning step, the servo information number at a position corresponding to the middle point of the variation range of the position error of the magnetic head relative to a target track is measured for a predetermined number of times with the revolution period of the magnetic disk, then the average of the measured servo information numbers is calculated, and thereby the phase relation between a change in said servo information number and a change in the eccentricity amount of the magnetic disk is learned.

6. An eccentricity control method for magnetic disk according to claim 1,
characterized in that in said phase learning step, the servo information number at a position corresponding to the middle point of the range variation of the traveling speed of the magnetic head following a target track is measured for a predetermined number of times with the revolution period of the magnetic disk, then the average of the measured servo information numbers is calculated, and thereby the phase relation between a change in said servo information number provided on the magnetic disk and a change in the eccentricity amount of the magnetic disk is learned.

7. An eccentricity control method for magnetic disk according to claim 1,
characterized in that in said phase learning step, two or three of the servo information numbers at positions of the maximum value, the minimum value, and the middle point of the variation range of the position error of the magnetic head relative to a target track are measured, then the difference is calculated between the measured servo information numbers, and when the difference falls within a predetermined value range, the phase relation between a change in said servo information number and a change in the eccentricity amount of the magnetic disk is learned.

8. An eccentricity control method for magnetic disk according to claim 1,
characterized in that in said phase learning step, two or three of the servo information numbers at positions of the maximum value, the minimum value, and the middle point of the range of variation of the traveling speed of the magnetic head following a target track are measured, then the difference is calculated between the measured servo information numbers, and when the difference falls within a predetermined range, the phase relation between a change in said servo information number and a change in the eccentricity amount of the magnetic disk is learned.

9. An eccentricity control method for magnetic disk according to claim 1, comprising a step of calculating the traveling speed of the magnetic head on the basis of the counter electromotive voltage of a voice coil motor for driving the magnetic head, characterized in that in said phase learning step, the phase deviation amount between a change in said servo information number present on the magnetic disk and a change in the eccentricity amount of the magnetic disk is learned; in the positioning of the magnetic head, said learned phase deviation amount is corrected using any one of the sine wave and the cosine wave depending on the revolution frequency of the magnetic disk; in the eccentricity compensating step, the signal obtained by multiplying the signal of sine wave or cosine wave by the weight coefficient is fed forward as the eccentricity compensation signal; and in a predetermined position between a servo information and another servo information, the eccentricity of the magnetic disk is compensated using said calculated traveling speed of the head.

10. An eccentricity control method for magnetic disk according to claim 1, characterized in that in said phase learning step, the phase relation between said servo information number provided on the magnetic disk and the eccentricity of the magnetic disk is learned; in the positioning of the magnetic head, the learned phase deviation amount is corrected using any one of the sine wave and the cosine wave depending on the revolution frequency of the magnetic disk; the signal obtained by multiplying the signal of sine wave or cosine wave by the weight coefficient is fed forward as the eccentricity compensation signal so that the eccentricity of the magnetic disk is compensated; and in seek and settling, the calculation of the weight coefficient and the re-calculation of the phase relation between the servo information number and the eccentricity are stopped, and then the eccentricity is compensated using a weight coefficient and a phase deviation correction value which are constant.

11. A recording medium having the record of a program of an eccentricity control method for magnetic disk, in a magnetic head positioning method for positioning at a target position a magnetic head for recording and reproducing information onto or from a revolving magnetic disk, by means of reading with said magnetic head, servo information containing a series of servo information numbers provided along each of a plurality of tracks having a series of track numbers on the magnetic disk, said eccentricity control method for magnetic disk comprising:

a phase learning step of learning a phase deviation amount representing the phase relation between a change in said servo information number read by said magnetic head and a change in the eccentricity amount of the magnetic disk;

a step of detecting a magnetic head positioning error signal on the basis of said phase deviation amount;

a step of generating a signal of sine wave in synchronization with the revolution frequency of the magnetic disk or of cosine wave having a phase difference of 90 degrees relative to said sine wave;

a step of obtaining a weight coefficient from said signal of sine wave or cosine wave and said magnetic head positioning error signal;

a step of multiplying the signal of sine wave or cosine wave by said weight coefficient and thereby obtaining an eccentricity compensation signal indicating an eccentricity control amount; and a step of controlling the magnetic head by using said eccentricity compensation signal, and thereby compensating the eccentricity of the magnetic disk.

12. A recording medium having the record of a program according to claim 11, wherein in said phase learning step, the servo information number at a position where the track number varying depending on the position of the magnetic head becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

13. A recording medium having the record of a program according to claim 11, wherein in said phase learning step, the servo information number at a position where the position error of the magnetic head relative to a target track becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

14. A recording medium having the record of a program according to claim 11, wherein in said phase learning step, the servo information number at a position where the traveling speed of the magnetic head following a target track becomes maximum or minimum is measured for a predetermined number of times with the revolution period of the magnetic disk, then the average of the measured servo information numbers is calculated, and thereby the phase relation between a change in said servo information number and a change in the eccentricity amount of the magnetic disk is learned.

15. A recording medium having the record of a program according to claim 11, wherein in said phase learning step, the servo information number at a position corresponding to the middle point of the range of variation of the position error of the magnetic head relative to a target track is measured for a predetermined number of times with the revolution period of the magnetic disk, then the average of the measured servo information numbers is calculated, and thereby the phase relation between a change in said servo information number and a change in the eccentricity amount of the magnetic disk is learned.

16. A recording medium having the record of a program according to claim 11, wherein in said phase learning step, the servo information number at a position corresponding to the middle point of the variation range of the traveling speed of the magnetic head following a target track is measured for a predetermined number of times with the revolution period of the magnetic disk, then the average of the measured servo information numbers is calculated, and thereby the phase relation between a change in said servo information number provided on the magnetic disk and a change in the eccentricity amount of the magnetic disk is learned.

17. A recording medium having the record of a program according to claim 11, wherein
in said phase learning step, two or three of the servo information numbers at positions corresponding to the maximum value, the minimum value, and the middle point of the variation range of the position error of the magnetic head relative to a target track are measured, then the difference is calculated between the measured servo information numbers, and when the difference falls within a predetermined range, the phase relation between a change in said servo information number and a change in the eccentricity amount of the magnetic disk is learned.

18. A recording medium having the record of a program according to claim 11, wherein
in said phase learning step, two or three of the servo information numbers of positions corresponding to the maximum value, the minimum value, and the middle point of the variation range of the traveling speed of the magnetic head following a target track are measured, then the difference is calculated between the measured servo information numbers, and when the difference falls within a predetermined value range, the phase relation between a change in said servo information number and a change in the eccentricity amount of the magnetic disk is learned.

19. A recording medium having the record of a program according to claim 11, comprising a step of calculating the traveling speed of the magnetic head on the basis of the counter electromotive voltage of a voice coil motor for driving the magnetic head, wherein:
in said phase learning step, the phase deviation amount between a change in said servo information number provided on the magnetic disk and a change in the eccentricity amount of the magnetic disk is learned; in the positioning of the magnetic head, said learned phase deviation amount is corrected using any one of the sine wave and the cosine wave depending on the revolution frequency of the magnetic disk; in the eccentricity compensating step, the signal obtained by multiplying the signal of sine wave or cosine wave by the weight coefficient is fed forward as the eccentricity compensation signal; and in a predetermined position between a servo information and another servo information, the eccentricity of the magnetic disk is compensated using said calculated traveling speed of the head.

20. A recording medium having the record of a program according to claim 11, wherein:
in said phase learning step, the phase relation between said servo information number provided on the magnetic disk and the eccentricity of the magnetic disk is learned; in the positioning of the magnetic head, the learned phase deviation amount is corrected using any one of the sine wave and the cosine wave depending on the revolution frequency of the magnetic disk; the signal obtained by multiplying the signal of sine wave or cosine wave by the weight coefficient is fed forward as the eccentricity compensation signal so that the eccentricity of the magnetic disk is compensated; and in seek and settling, the calculation of the weight coefficient and the re-calculation of the phase relation between the servo information number and the eccentricity are stopped, and then the eccentricity is compensated using a weight coefficient and a phase deviation correction value which are constant.

21. A magnetic disk apparatus, in a magnetic head positioning apparatus for positioning at a target position a magnetic head for recording and reproducing information onto or from a revolving magnetic disk, by means of reading, with said magnetic head, servo information containing a series of servo information numbers provided along each of a plurality of tracks having a series of track numbers on the magnetic disk,
comprising:
a phase learning device for learning a phase deviation amount which is the phase relation between a change in said servo information number read by the magnetic head and a change in the eccentricity amount of the magnetic disk;
an error detector for detecting a magnetic head positioning error signal on the basis of said phase deviation amount;
a sine wave generator for generating a signal of sine wave in synchronization with the revolution frequency of the magnetic disk or of cosine wave having a phase difference of 90 degrees relative to said sine wave;
an eccentricity control amount calculator for determining a weight coefficient from said signal of sine wave or cosine wave and said magnetic head positioning error signal and thereby outputting an eccentricity control amount; and
a positioning controller for generating an eccentricity compensation signal on the basis of said eccentricity control amount and thereby outputting the signal to the magnetic head.

22. A magnetic disk apparatus according to claim 21, wherein
said phase learning device measures the servo information number at a position where the track number varying depending on the position of the magnetic head becomes maximum or minimum, for a predetermined number of times with the revolution period of the magnetic disk, then calculates the average of the measured servo information numbers, and thereby learns the phase relation between a change in said servo information number and a change in the eccentricity amount of the magnetic disk.

23. A magnetic disk apparatus according to claim 21, wherein
said phase learning device measures the servo information number at a position where the position error of the magnetic head relative to a target track becomes maximum or minimum, for a predetermined number of times with the revolution period of the magnetic disk, then calculates the average of the measured servo information numbers, and thereby learns the phase relation between a change in said servo information number and a change in the eccentricity amount of the magnetic disk.

24. A magnetic disk apparatus according to claim 21, wherein said phase learning device measures the servo information number at a position where the traveling speed of the magnetic head following a target track becomes maximum or minimum, for a predetermined number of times with the revolution period of the magnetic disk, then calculates the average of the servo information numbers, and thereby learns the phase relation between a change in said servo information number present on the magnetic disk and a change in the eccentricity amount of the magnetic disk.

25. A magnetic disk apparatus according to claim 21, wherein
said phase learning device measures the servo information number at a position corresponding to the middle point of the variation range of the position error of the magnetic head relative to a target track, for a predetermined number of times with the revolution period of the magnetic disk, then calculates the average of the servo information numbers, and thereby learns the phase relation between a change in said servo information number and a change in the eccentricity amount of the magnetic disk.

26. A magnetic disk apparatus according to claim 21, wherein
said phase learning device measures the servo information number at a position corresponding to the middle point of the variation range of the traveling speed of the magnetic head following a target track, for a predetermined number of times with the revolution period of the magnetic disk, then calculates the average of the servo information numbers, and thereby learns the phase relation between a change in said servo information number provided on the magnetic disk and a change in the eccentricity amount of the magnetic disk.

27. A magnetic disk apparatus according to claim 21, wherein
said phase learning device measures two or three of the servo information numbers at positions corresponding to the maximum value, the minimum value, and the middle point of the variation range of the position error of the magnetic head relative to a target track, then calculates the difference between the measured servo information numbers, and then learns the phase relation between a change in said servo information number present on the magnetic disk and a change in the eccentricity amount of the magnetic disk, when the difference falls within a predetermined range.

28. A magnetic disk apparatus according to claim 21, wherein
said phase learning device measures two or three of the servo information numbers at positions corresponding to the maximum value, the minimum value, and the middle point of the variation range of the speed of the magnetic head following a target track, then calculates the difference between the measured servo information numbers, and then learns the phase relation between a change in said servo information number present on the magnetic disk and a change in the eccentricity amount of the magnetic disk, when the difference falls within a predetermined range.

29. A magnetic disk apparatus according to claim 21, wherein:
said phase learning device learns the phase deviation amount between said servo information number present on the magnetic disk and the eccentricity amount of the magnetic disk; in the positioning of the magnetic head, said learned phase deviation amount is corrected using any one of the sine wave and the cosine wave depending on the revolution frequency of the magnetic disk; the signal obtained by multiplying the signal of sine wave or cosine wave by the weight coefficient is fed forward as the eccentricity compensation signal; and in a predetermined position between a servo information and another servo information, the eccentricity is compensated using the traveling speed of the magnetic head calculated by said head speed calculating section.

30. A magnetic disk apparatus according to claim 21, wherein:
in the start up of the magnetic disk apparatus, the phase relation between a change in said servo information number present on the magnetic disk and the eccentricity of the magnetic disk is learned; in the positioning of the magnetic head, said learned phase deviation amount is corrected using any one of the sine wave and the cosine wave depending on the revolution frequency of the magnetic disk; the eccentricity control amount calculator feeds forward the signal obtained by multiplying the signal of sine wave or cosine wave by the weight coefficient, as the eccentricity compensation signal, and thereby compensates the eccentricity; and in seek and settling, the calculation of the weight coefficient and the re-calculation of the phase relation between the servo information number and the eccentricity are stopped, and then the eccentricity is compensated using a weight coefficient and a phase deviation amount correction value which are constant.

* * * * *

UNITED STATES PATENT AND TRADEMARK OFFICE
CERTIFICATE OF CORRECTION

| | | |
|---|---|---|
| PATENT NO. | : 7,012,778 B2 | Page 1 of 1 |
| APPLICATION NO. | : 10/450636 | |
| DATED | : March 14, 2006 | |
| INVENTOR(S) | : Norio Shigematsu | |

It is certified that error appears in the above-identified patent and that said Letters Patent is hereby corrected as shown below:

Title Page, Section (57):

Line 6 of the Abstract, after "cosine wave the phase", insert -- deviation amount of which is corrected depending on --.

Signed and Sealed this

Twenty-eighth Day of November, 2006

JON W. DUDAS
*Director of the United States Patent and Trademark Office*